US007228232B2

(12) United States Patent
Bodin et al.

(10) Patent No.: US 7,228,232 B2
(45) Date of Patent: Jun. 5, 2007

(54) NAVIGATING A UAV WITH OBSTACLE AVOIDANCE ALGORITHMS

(75) Inventors: William Kress Bodin, Austin, TX (US); Jesse Redman, Cedar Park, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 11/041,831

(22) Filed: Jan. 24, 2005

(65) Prior Publication Data

US 2007/0106473 A1   May 10, 2007

(51) Int. Cl.
G01C 21/00 (2006.01)
(52) U.S. Cl. .......................... 701/301; 701/213; 701/2; 244/190
(58) Field of Classification Search ............... None
See application file for complete search history.

(56) References Cited

U.S. PATENT DOCUMENTS

| | | | |
|---|---|---|---|
| 5,240,207 A | | 8/1993 | Eiband et al. |
| 5,552,983 A | | 9/1996 | Thornbert et al. |
| 5,581,250 A | | 12/1996 | Khvilivitzky |
| 5,716,032 A | | 2/1998 | McIngvale |
| 5,890,441 A | | 4/1999 | Swinson et al. |
| 5,904,724 A | * | 5/1999 | Margolin ................. 701/120 |
| 6,056,237 A | | 5/2000 | Woodland |
| 6,130,705 A | | 10/2000 | Lareau et al. |
| 6,219,004 B1 | | 4/2001 | Johnson |
| 6,377,875 B1 | | 4/2002 | Schwaerzler |
| 6,498,968 B1 | | 12/2002 | Bush |
| 6,694,228 B2 | * | 2/2004 | Rios ........................... 701/2 |
| 6,785,610 B2 | * | 8/2004 | Baker et al. ............... 701/301 |
| 7,050,909 B2 | * | 5/2006 | Nichols et al. ............ 701/301 |
| 7,061,401 B2 | * | 6/2006 | Voos et al. ................ 340/961 |
| 7,127,334 B2 | * | 10/2006 | Frink ........................... 701/3 |
| 2001/0035995 A1 | | 11/2001 | Ruggiero |
| 2004/0193334 A1 | * | 9/2004 | Carlsson et al. ............ 701/9 |

OTHER PUBLICATIONS

Sutcliffe, et al.; Decentralised Data Fusion Applied to a Network of Unmanned Aerial Vehicles; Inspec AN 7289965; Feb. 2002; pp. 71-76; Piscataway, NJ; USA.

(Continued)

*Primary Examiner*—Michael J. Zanelli
(74) *Attorney, Agent, or Firm*—Justin Dillon; H. Artoush Ohanian; Biggers & Ohanian, LLP

(57) ABSTRACT

Methods, systems, and computer program products are provided for navigating a UAV that include piloting the UAV, under control of a navigation computer, in accordance with a navigation algorithm. While piloting the UAV, embodiments include reading from the GPS receiver a sequence of GPS data, anticipating a future position of the UAV, identifying an obstacle in dependence upon the future position, selecting an obstacle avoidance algorithm, and piloting the UAV in accordance with an obstacle avoidance algorithm. Identifying an obstacle in dependence upon the future position may include comprises retrieving obstacle data from a database in dependence the future position. Identifying an obstacle in dependence upon the future position may also include depicting an anticipated flight of the UAV with 3D computer graphics in dependence upon the future position and identifying an obstacle in dependence upon the depiction of the anticipated flight.

18 Claims, 23 Drawing Sheets

OTHER PUBLICATIONS

Johnson, et al; Improving Geolocation and Spatial Accuracies with the Modular Integrated Avionics Group; Inspec AN 5467118; pp. 88-97; Apr. 1996; SPIE-Int. Soc. Opt.; England.

Gunapala, et al.; QWIP Technology for Both Military and Civilian Applications; Inspec AN 7255522; Apr. 2001; pp. 498-505; SPIE-Int. Soc. Opt.; England.

Spenny, et al; Closely Supervised Control of a Target-Steered UAV; Inspec AN 6652724;Sep. 1999; pp. 179-190; SPIE-Int. Soc. Opt.; England.

RQ-1 Predator Unmanned Aerial Vehicle; May 2002; pp. 1-3; U.S. Air Force Fact Sheet; USA.

Gormley, et al; Controlling Unmanned Air Vehicles: New Challenges; Mar. 2003; pp. 1-21; Commissioned by the Non-Proliferation Education Center; USA.

Young; Unmanned Aerial Vehicles Web Site; pp. 1-2; NASA GSFC/Wallops Flight Facility, Wallops Island, VA; USA.

Unammanned Aircraft.com Website; http://www.unmannedaircraft.con/.

Stellman, et al.; War Horse; Apr. 2001; Inspec. AN 7295892; vol. 4379; pp. 339-346; SPIE-Int. Soc. Opt.; USA.

Dittrich, et al.; 21st Digital Avionics Systems Conference; Oct. 2002; Inspec. AN 7614545; vol. 2; IEEE; Piscataway, NJ; USA.

Dittrich; Design and Integration of an Unmanned Aerial Vehicle Navigation System; Thesis; May 2002; pp. i-52; Georgia Institute of Technology; USA.

Somers; Unmanned Aerial Vehicle—Demonstration of Autonomous Flight, 09-9822; 1999 IR&D Home; pp. 1-4; USA.

Brown, et al.; Airporne Reconnaissance XXIII; Jul. 1999; pp. 2-8; vol. 3751; SPIE-Int. Soc. Opt; England.

Nettleton, et al.; Multiple Platform Localization and Map Building; Nov. 2000; pp. 337-347; Inspec AN 6979413; SPEI-Int. Soc. Opt. Eng; US.

Schumacher et al.; Adaptive Control of UAVs in Close-coupled Formation Flight; 2000; pp. 849-853; Insp An 6770904; vol. 6 Danvers, MA; US.

Singh et al; Adaptive Freedback Linearizing Nonlinear Close Formation Control of UAVs; 2000; pp. 854-858; Inspec AN 6770905; vol. 2; Danvers, Ma; US.

21st Digital Avionics Systems Conference; 2002; Inspec AN 7614402; vol. 1; IEEE; Piscataway, NJ; US.

Hallberg, et al.; Development of a Flight Test Systems for Unmanned Air Vehicles; Feb. 1999; pp. 55-65; IEEE vol. 19; Inspec AN 6176739; Monterey, CA; US.

Shiller, et al.; Mission Adaptable Autonomous Vehicles; 1991; pp. 143-150; Inspec AN 4208922; Newton, MA; US.

* cited by examiner

NAVIGATING A UAV WITH OBSTACLE AVOIDANCE ALGORITHMS

BACKGROUND OF THE INVENTION

1. Field of the Invention

The field of the invention is data processing, or, more specifically, methods, systems, and products for navigating a UAV with obstacle avoidance algorithms.

2. Description of Related Art

Many forms of UAV are available in prior art, both domestically and internationally. Their payload weight carrying capability, their accommodations (volume, environment), their mission profiles (altitude, range, duration), and their command, control and data acquisition capabilities vary significantly. Routine civil access to these various UAV assets is in an embryonic state.

Conventional UAVs are typically manually controlled by an operator who may view aspects of a UAV's flight using cameras installed on the UAV with images provided through downlink telemetry. Navigating such UAVs from a starting position to one or more waypoints requires an operator to have specific knowledge of the UAV's flight, including such aspects as starting location, the UAV's current location, waypoint locations, and so on. Operators of prior art UAVs usually are required generally to manually control the UAV from a starting position to a waypoint with little aid from automation. There is therefore an ongoing need for improvement in the area of UAV navigations.

SUMMARY OF THE INVENTION

Methods, systems, and computer program products are provided for navigating a UAV that include piloting the UAV, under control of a navigation computer, in accordance with a navigation algorithm. While piloting the UAV, embodiments include reading from the GPS receiver a sequence of GPS data, anticipating a future position of the UAV, identifying an obstacle in dependence upon the future position, selecting an obstacle avoidance algorithm, and piloting the UAV in accordance with an obstacle avoidance algorithm. Identifying an obstacle in dependence upon the future position may include comprises retrieving obstacle data from a database in dependence the future position. Identifying an obstacle in dependence upon the future position may also include depicting an anticipated flight of the UAV with 3D computer graphics in dependence upon the future position and identifying an obstacle in dependence upon the depiction of the anticipated flight.

Piloting the UAV in accordance with an obstacle avoidance algorithm may include identifying an intermediate waypoint, flying past the intermediate waypoint, identifying a second intermediate waypoint on an originally anticipated course, flying past the second intermediate waypoint, calculating a new heading to an original destination waypoint, and piloting on the new heading in accordance with a navigational algorithm. Piloting the UAV in accordance with an obstacle avoidance algorithm may also include identifying an intermediate waypoint, flying past the intermediate waypoint, calculating a new heading to an original destination waypoint, and piloting on the new heading in accordance with a navigational algorithm. Piloting the UAV in accordance with an obstacle avoidance algorithm may also include determining a new altitude greater than the height of the identified obstacle and piloting the UAV at the new altitude.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
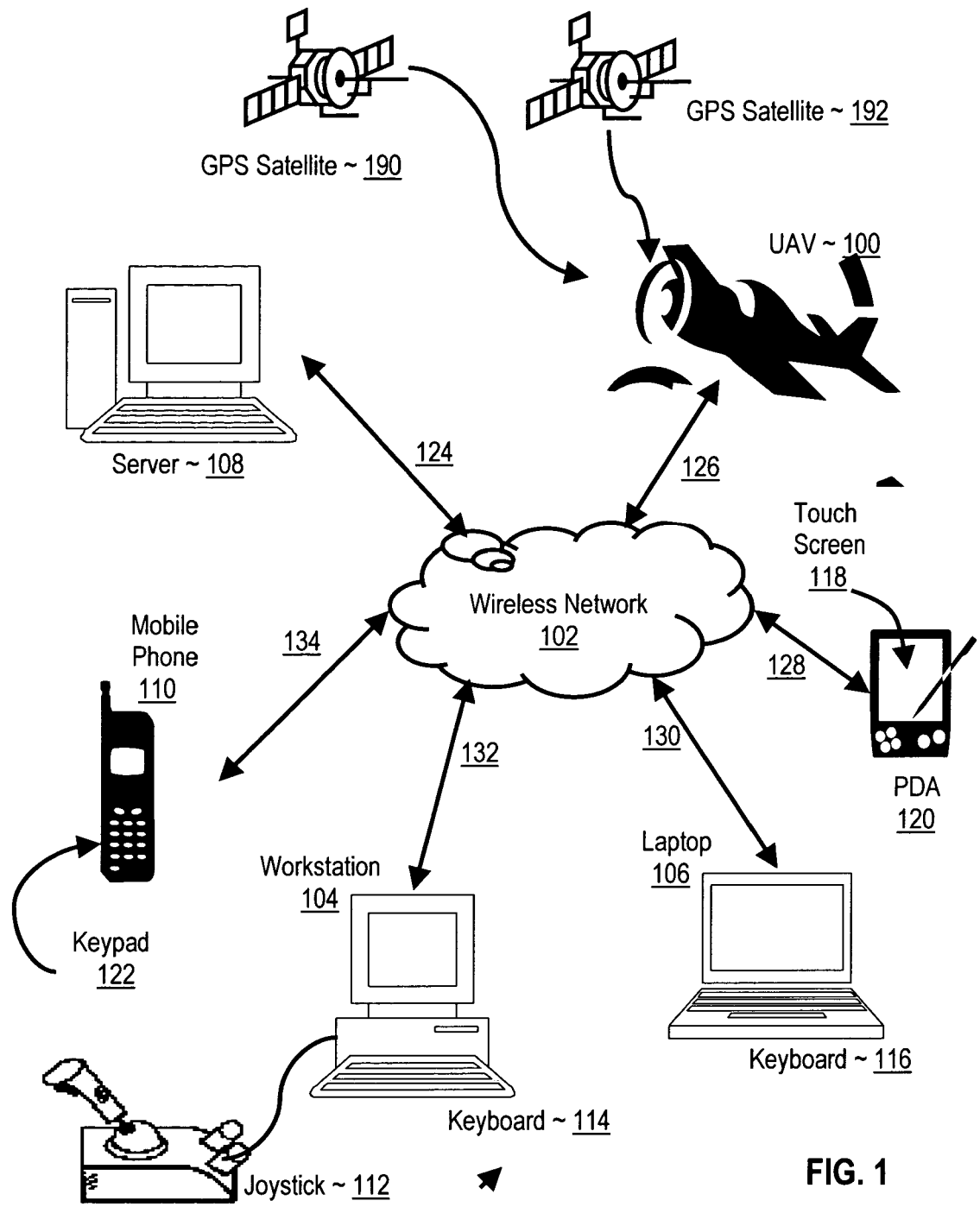
FIG. 1 sets forth a system diagram illustrating relations among components of an exemplary system for navigating a UAV.

The present invention is described to a large extent in this specification in terms of methods for navigating a UAV with obstacle avoidance algorithms. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"Airspeed" means UAV airspeed, the speed of the UAV through the air.

A "cross track" is a fixed course from a starting point directly to a waypoint. A cross track has a direction, a 'cross track direction,' that is the direction straight from a starting point to a waypoint. That is, a cross track direction is the heading that a UAV would fly directly from a starting point to a waypoint in the absence of wind.

"GUI" means graphical user interface, a display means for a computer screen.

"Heading" means the compass heading of the UAV.

"Course" means the direction of travel of the UAV over the ground. That is, a "course" in this specification is what is called, in some lexicons of air navigation, a 'track.' In the absence of wind, or in the presence of a straight tailwind or straight headwind, the course and the heading are the same direction. In the presence of cross wind, the course and the heading are different directions.

"Position" refers to a location in the air or over the ground. 'Position' is typically specified as Earth coordinates, latitude and longitude. A specification of position may also include altitude.

A "waypoint" is a position chosen as a destination for navigation of a route. A route has one or more waypoints. That is, a route is composed of waypoints, including at least one final waypoint, and one or more intermediate waypoints.

"TDMA" stands for Time Division Multiple Access, a technology for delivering digital wireless service using time-division multiplexing. TDMA works by dividing a radio frequency into time slots and then allocating slots to multiple calls. In this way, a single frequency can support multiple, simultaneous data channels. TDMA is used by GSM.

"GSM" stands for Global System for Mobile Communications, a digital cellular standard. GSM at this time is the de facto standard for wireless digital communications in Europe and Asia.

"CDPD" stands for Cellular Digital Packet Data, a data transmission technology developed for use on cellular phone frequencies. CDPD uses unused cellular channels to transmit data in packets. CDPD supports data transfer rates of up to 19.2 Kbps.

"GPRS" stands for General Packet Radio Service, a standard for wireless data communications which runs at speeds up to 150 Kbps, compared with current GSM systems which cannot support more than about 9.6 Kbps. GPRS, which supports a wide range of speeds, is an efficient use of limited bandwidth and is particularly suited for sending and receiving small bursts of data, such as e-mail and Web browsing, as well as large volumes of data.

"EDGE" stands for Enhanced Data Rates for GSM Evolution, a standard for wireless data communications supporting data transfer rates of more than 300 Kbps. GPRS and EDGE are considered interim steps on the road to UMTS.

"UMTS" stands for Universal Mobile Telecommunication System, a standard for wireless data communications supporting data transfer rates of up to 2 Mpbs. UMTS is also referred to W-CDMA for Wideband Code Division Multiple Access.

Exemplary Architecture

Methods, systems, and products for navigating a UAV are explained with reference to the accompanying drawings, beginning with FIG. 1. FIG. 1 sets forth a system diagram illustrating relations among components of an exemplary system for navigating a UAV. The system of FIG. 1 includes UAV (100) which includes a GPS (Global Positioning System) receiver (not shown) that receives a steady stream of GPS data from satellites (190, 192). For convenience of explanation, only two GPS satellites are shown in FIG. 1, although the GPS satellite network in fact includes 24 GPS satellites.

The system of FIG. 1 operates to navigate a UAV by receiving in a remote control device a user's selection of a GUI map pixel that represents a waypoint for UAV navigation. Each such pixel has a location on a GUI map, typically specified as a row and column position. Examples of remote control devices in FIG. 1 include mobile telephone (110), workstation (104), laptop computer (106), and PDA (Personal Digital Assistant) (120). Each such remote control device is capable of supporting a GUI display of a map of the surface of the Earth in which each pixel on the GUI map represents a position on the Earth.

Each remote control device also supports at least one user input device through which a user may enter the user's selection of a pixel. Examples of user input devices in the system of FIG. 1 include telephone keypad (122), workstation keyboard (114), workstation joystick (112), laptop keyboard (116) and PDA touch screen (118).

The system of FIG. 1 typically is capable of operating a remote control device to map the pixel' location on the GUI to Earth coordinates of a waypoint and to transmit the coordinates of the waypoint to the UAV (100). In the example of FIG. 1, waypoint coordinates are generally transmitted from remote control devices to the UAV through wireless network (102). Wireless network (102) is implemented using any wireless data transmission technology as will occur to those of skill in the art including, for example, TDMA, GSM, CDPD, GPRS, EDGE, and UMTS. In a preferred embodiment, a data communications link layer is implemented using one of these technologies, a data communications network layer is implemented with the Internet Protocol ("IP"), and a data communications transmission layer is implemented using the Transmission Control Protocol ("TCP"). In such systems, telemetry between the UAV and remote control devices, including waypoint coordinates, are transmitted using an application-level protocol such as, for example, the HyperText Transmission Protocol ("HTTP"), the Wireless Application Protocol ("WAP"), the Handheld Device Transmission Protocol ("HDTP"), or any other data communications protocol as will occur to those of skill in the art.

The system of FIG. 1 typically is capable of operating a UAV to read a starting position from a GPS receiver (reference 186 on FIG. 2) on the UAV and pilot the UAV, under control of a navigation computer on the UAV, from a starting position to a waypoint in accordance with a navigation algorithm. The system of FIG. 1 is also capable of reading from the GPS receiver on the UAV a sequence of GPS data representing a flight path of the UAV and depicting the flight of the UAV with 3D computer graphics while the UAV is piloting under control of a navigation computer on the UAV.

The system of FIG. 1 is also capable generally of navigating a UAV by piloting the UAV, under control of a navigation computer, in accordance with a navigation algorithm. While piloting the UAV, the system of FIG. 1 is capable of reading from the GPS receiver a sequence of GPS data, anticipating a future position of the UAV, identifying an obstacle in dependence upon the future position, selecting an obstacle avoidance algorithm, and piloting the UAV in accordance with an obstacle avoidance algorithm.

Figure 2:
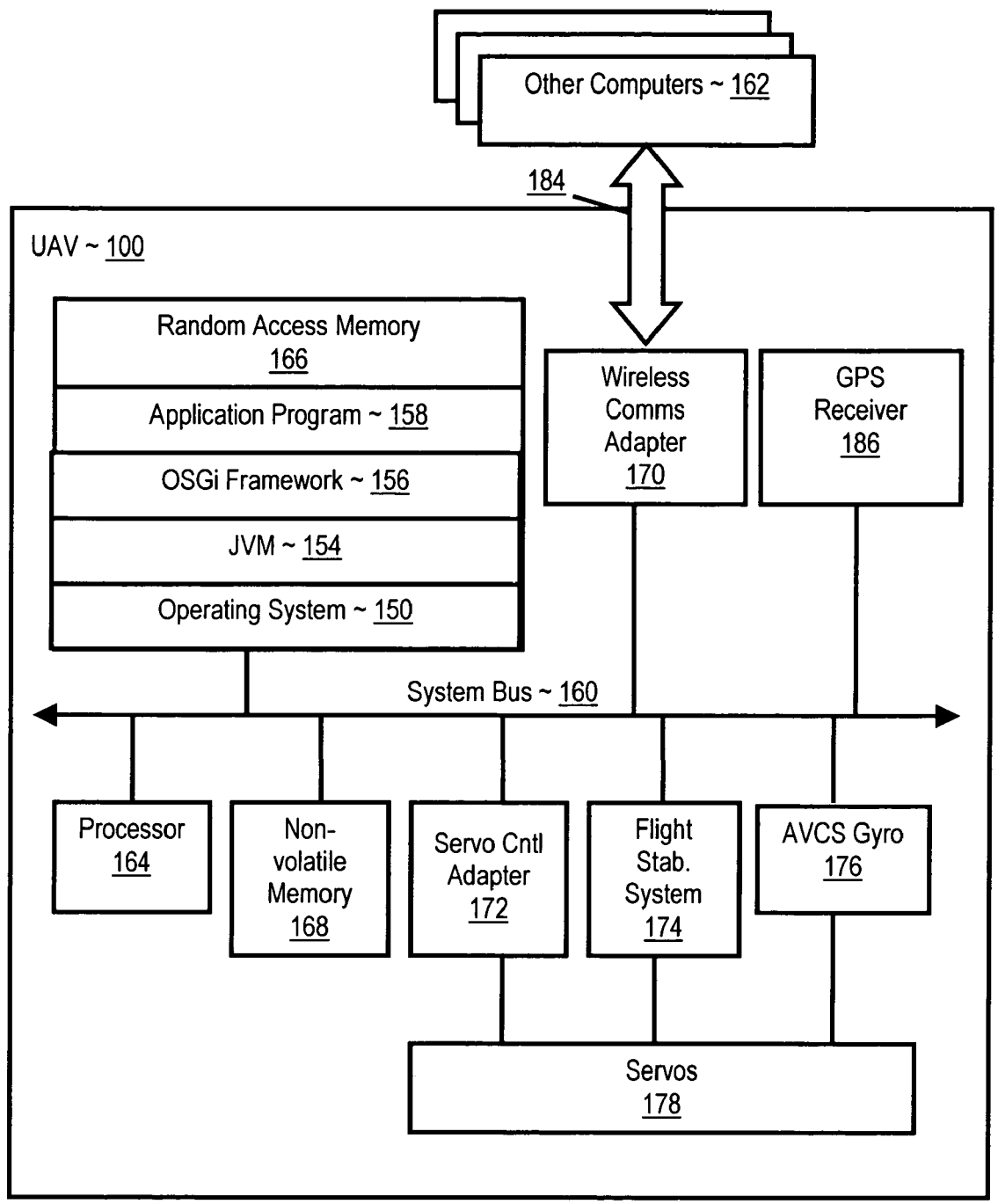
FIG. 2 is a block diagram of an exemplary UAV showing relations among components of included automated computing machinery.

UAVs according to embodiments of the present invention typically include, not only an aircraft, but also automated computing machinery capable of receiving GPS data, operating telemetry between the UAV and one or more remote control devices, and navigating a UAV among waypoints. FIG. 2 is a block diagram of an exemplary UAV showing relations among components of included automated computing machinery. In FIG. 2, UAV (100) includes a processor (164), also typically referred to as a central processing unit or 'CPU.' The processor may be a microprocessor, a programmable control unit, or any other form of processor useful according to the form factor of a particular UAV as will occur to those of skill in the art. Other components of UAV (100) are coupled for data transfer to processor (164) through system bus (160).

UAV (100) includes random access memory or 'RAM' (166). Stored in RAM (166) is an application program (158) that implements inventive methods according to embodiments of the present invention. In some embodiments, the application programming runs on an OSGi services framework (156). OSGi Stands for 'Open Services Gateway Initiative.' The OSGi specification is a Java-based application layer framework that provides vendor neutral application layer APIs and functions. An OSGi service framework (156) is written in Java and therefore typically runs on a Java Virtual Machine (JVM) (154) which in turn runs on an operating system (150). Examples of operating systems useful in UAVs according to the present invention include Unix, AIX™, and Microsoft Windows™.

In OSGi, the framework is a hosting platform for running 'services'. Services are the main building blocks for creating applications according to the OSGi. A service is a group of Java classes and interfaces that implement a certain feature. The OSGi specification provides a number of standard services. For example, OSGi provides a standard HTTP service that can respond to requests from HTTP clients, such as, for example, remote control devices according to embodiments of the present invention. That is, such remote control devices are enabled to communicate with a UAV having an HTTP service by use of data communications messages in the HTTP protocol. Services in OSGi are packaged in 'bundles' with other files, images, and resources that the services need for execution. A bundle is a Java archive or 'JAR' file including one or more service implementations, an activator class, and a manifest file. An activator class is a Java class that the service framework uses to start and stop a bundle. A manifest file is a standard text file that describes the contents of the bundle.

The services framework in OSGi also includes a service registry. The service registry includes a service registration including the service's name and an instance of a class that implements the service for each bundle installed on the framework and registered with the service registry. A bundle may request services that are not included in the bundle, but are registered on the framework service registry. To find a service, a bundle performs a query on the framework's service registry.

The application (158) of FIG. 2 is capable generally of navigating a UAV by piloting the UAV in accordance with a navigation algorithm. While piloting the UAV, the application of FIG. 2 is capable of reading from the GPS receiver a sequence of GPS data, anticipating a future position of the UAV, identifying an obstacle in dependence upon the future position, selecting an obstacle avoidance algorithm, and piloting the UAV in accordance with an obstacle avoidance algorithm.

In the UAV (100) of FIG. 2, software programs and other useful information may be stored in RAM or in non-volatile memory (168). Non-volatile memory (168) may be implemented as a magnetic disk drive such as a micro-drive, an optical disk drive, static read only memory ('ROM'), electrically erasable programmable read-only memory space ('EEPROM' or 'flash' memory), or otherwise as will occur to those of skill in the art.

UAV (100) includes communications adapter (170) implementing data communications connections (184) to other computers (162), which may be wireless networks, satellites, remote control devices, servers, or others as will occur to those of skill in the art. Communications adapters implement the hardware level of data communications connections through which UAVs transmit wireless data communications. Examples of communications adapters include wireless modems for dial-up connections through wireless telephone networks.

UAV (100) includes servos (178). Servos (178) are proportional control servos that convert digital control signals from system bus (160) into actual proportional displacement of flight control surfaces, ailerons, elevators, and the rudder. The displacement of flight control surfaces is 'proportional' to values of digital control signals, as opposed to the 'all or nothing' motion produces by some servos. In this way, ailerons, for example, may be set to thirty degrees, sixty degrees, or any other supported angle rather than always being only neutral or fully rotated. Several proportional control servos useful in various UAVs according to embodiments of the present invention are available from Futaba®.

UAV (100) includes a servo control adapter (172). A servo control adapter (172) is multi-function input/output servo motion controller capable of controlling several servos. An example of such a servo control adapter is the "IOSERVO" model from National Control Devices of Osceola, Mo. The IOSERVO is described on National Control Devices website at www.controlanything.com.

UAV (100) includes a flight stabilizer system (174). A flight stabilizer system is a control module that operates servos (178) to automatically return a UAV to straight and level flight, thereby simplifying the work that must be done by navigation algorithms. An example of a flight stabilizer system useful in various embodiments of UAVs according to the present invention is model Co-Pilot™ from FMA, Inc., of Frederick, Md. The Co-Pilot flight stabilizer system identifies a horizon with heat sensors, identifies changes in aircraft attitude relative to the horizon, and sends corrective signals to the servos (178) to keep the UAV flying straight and level.

UAV (100) includes an AVCS gyro (176). An AVCS gryo is an angular vector control system gyroscope that provides control signal to the servos to counter undesired changes in attitude such as those caused by sudden gusts of wind. An example of an AVCS gyro useful in various UAVs according to the present invention is model GYA350 from Futaba®.

Figure 3:
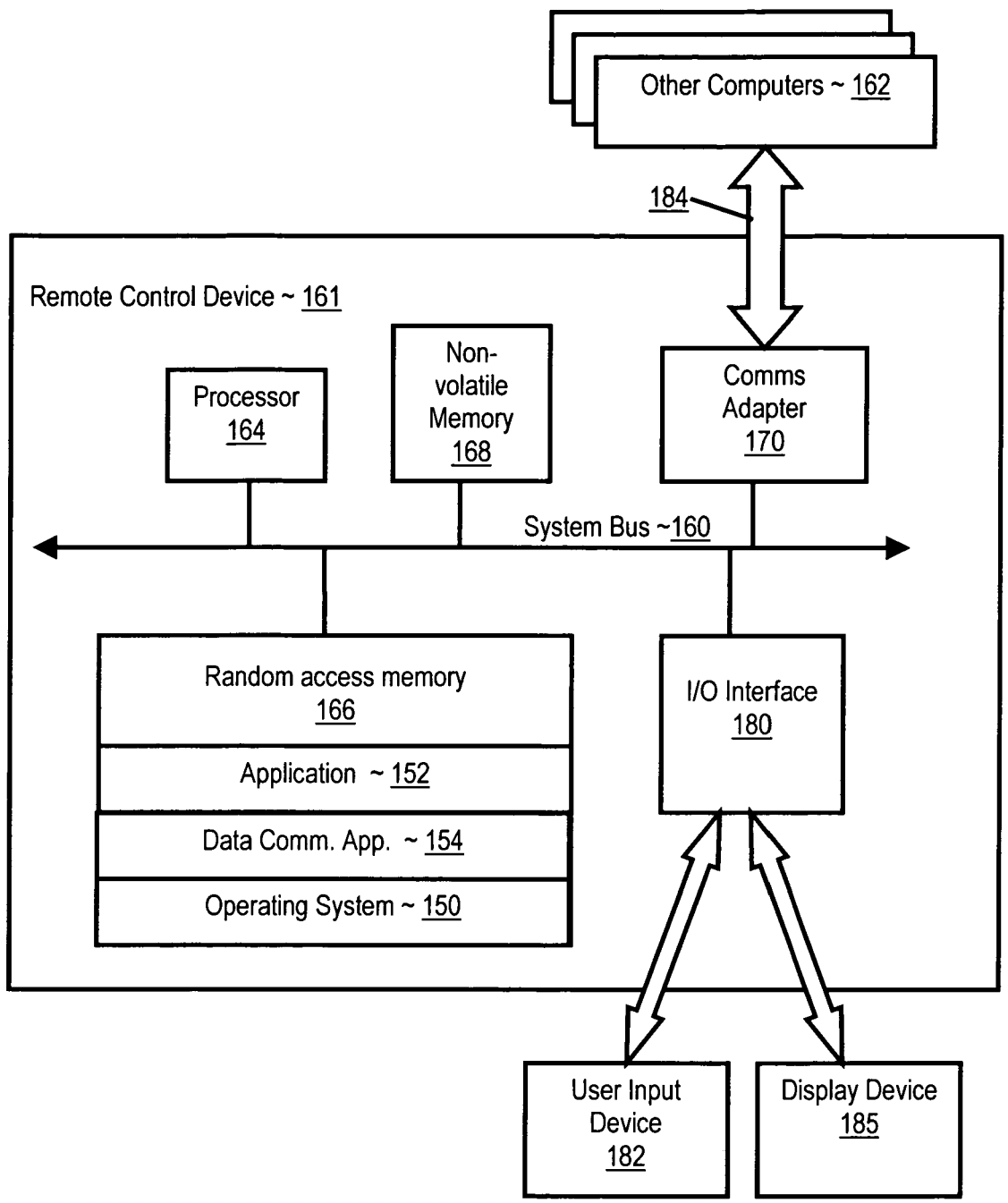
FIG. 3 is a block diagram of an exemplary remote control device showing relations among components of included automated computing machinery.

Remote control devices according to embodiments of the present invention typically comprise automated computing machinery capable of receiving user selections of pixel on GUI maps, mapping the pixel to a waypoint location, and transmitting the waypoint location to a UAV. FIG. 3 is a block diagram of an exemplary remote control device showing relations among components of included automated computing machinery. In FIG. 3, remote control device (161) includes a processor (164), also typically referred to as a central processing unit or 'CPU.' The processor may be a microprocessor, a programmable control unit, or any other form of processor useful according to the form factor of a particular remote control device as will occur to those of skill in the art. Other components of remote control device (161) are coupled for data transfer to processor (164) through system bus (160).

Remote control device (161) includes random access memory or 'RAM' (166). Stored in RAM (166) an application program (152) that implements inventive methods of the present invention. The application (152) of FIG. 3 is capable generally of navigating a UAV by piloting the UAV in accordance with a navigation algorithm. While piloting the UAV, the application of FIG. 3 is capable of reading from the GPS receiver a sequence of GPS data, anticipating a future position of the UAV, identifying an obstacle in dependence upon the future position, selecting an obstacle avoidance algorithm, and piloting the UAV in accordance with an obstacle avoidance algorithm.

In some embodiments, the application program (152) is OSGi compliant and therefore runs on an OSGi services framework installed (not shown) on a JVM (not shown). In addition, software programs and further information for use in implementing methods of navigating a UAV according to embodiments of the present invention may be stored in RAM or in non-volatile memory (168). Non-volatile memory (168) may be implemented as a magnetic disk drive such as a micro-drive, an optical disk drive, static read only memory ('ROM'), electrically erasable programmable read-only memory space ('EEPROM' or 'flash' memory), or otherwise as will occur to those of skill in the art.

Remote control device (161) includes communications adapter (170) implementing data communications connections (184) to other computers (162), including particularly computes on UAVs. Communications adapters implement the hardware level of data communications connections through which remote control devices communicate with UAVs directly or through networks. Examples of communications adapters include modems for wired dial-up connections, Ethernet (IEEE 802.3) adapters for wired LAN connections, 802.11b adapters for wireless LAN connections, and Bluetooth adapters for wireless microLAN connections.

The example remote control device (161) of FIG. 3 includes one or more input/output interface adapters (180). Input/output interface adapters in computers implement user-oriented input/output through, for example, software drivers and computer hardware for controlling output to display devices (185) such as computer display screens, as well as user input from user input devices (182) such as keypads, joysticks, keyboards, and touch screens.

Navigating a UAV with On-Board Navigation Algorithms with Flight Depiction

Figure 4:
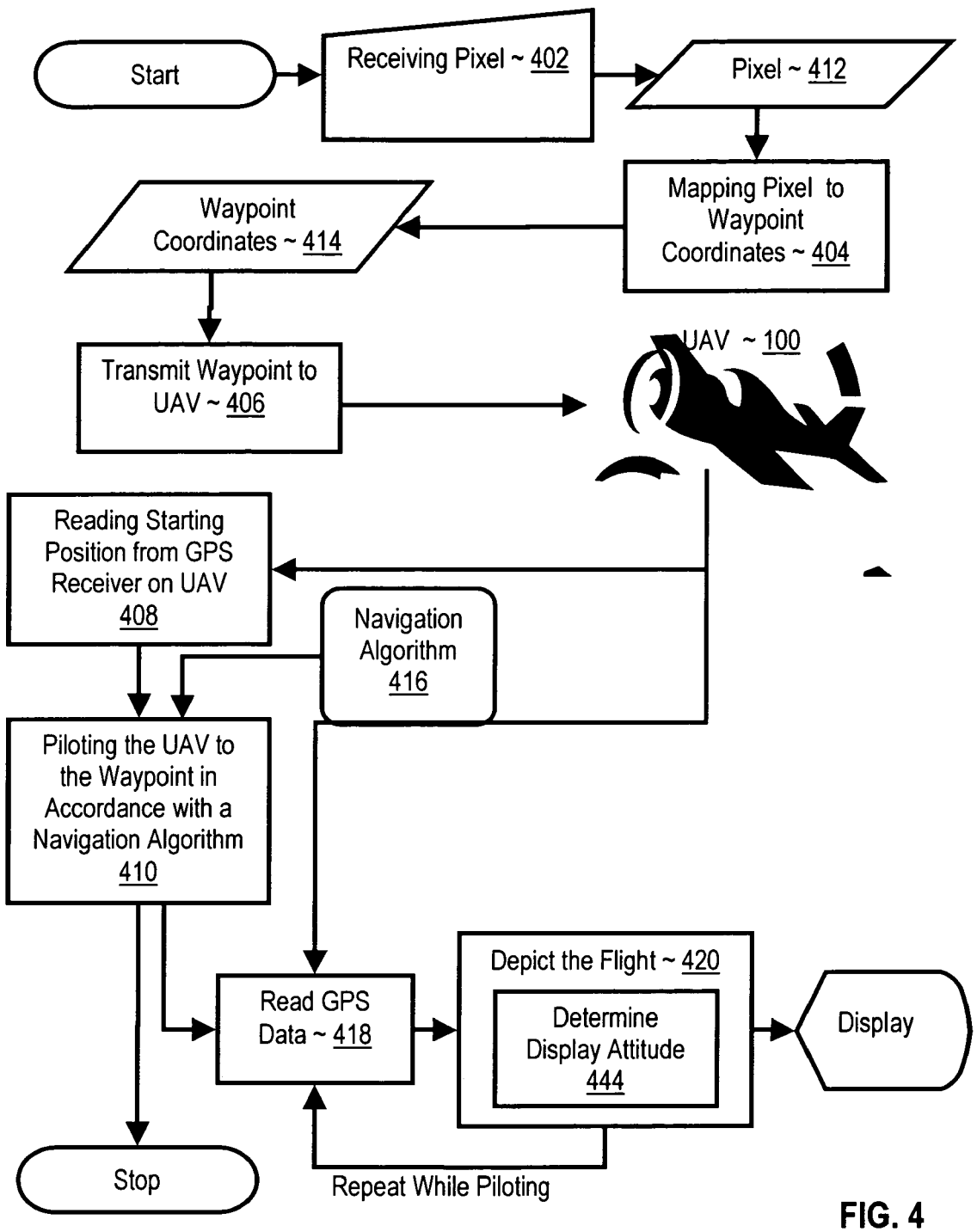
FIG. 4 sets forth a flow chart illustrating an exemplary method for navigating a UAV that includes receiving in a remote control device a user's selection of a GUI map pixel that represents a waypoint for UAV navigation.

FIG. 4 sets forth a flow chart illustrating an exemplary method for navigating a UAV that includes receiving (402) in a remote control device a user's selection of a GUI map pixel (412) that represents a waypoint for UAV navigation. The pixel has a location on the GUI. Such a GUI map display has many pixels, each of which represents at least one position on the surface of the Earth. A user selection of a pixel is normal GUI operations to take a pixel location, row and column, from a GUI input/output adapter driven by a user input device such as a joystick or a mouse. The remote control device can be a traditional 'ground control station,' an airborne PDA or laptop, a workstation in Earth orbit, or any other control device capable of accepting user selections of pixels from a GUI map.

The method of FIG. 4 includes mapping (404) the pixel's location on the GUI to Earth coordinates of the waypoint (414). As discussed in more detail below with reference to FIG. 5, mapping (404) the pixel's location on the GUI to Earth coordinates of the waypoint (414) typically includes mapping pixel boundaries of the GUI map to corresponding Earth coordinates and identifying a range of latitude and a range of longitude represented by each pixel. Mapping (404) the pixel's location on the GUI to Earth coordinates of the waypoint (414) also typically includes locating a region on the surface of the Earth in dependence upon the boundaries, the ranges, and the location of the pixel on the GUI map.

The method of FIG. 4 also includes transmitting (406) the coordinates of the waypoint to the UAV (100). Transmitting (406) the coordinates of the waypoint to the UAV (100) may be carried out by use of any data communications protocol, including, for example, transmitting the coordinates as form data, URI encoded data, in an HTTP message, a WAP message, an HDML message, or any other data communications protocol message as will occur to those of skill in the art.

The method of FIG. 4 also includes reading (408) a starting position from a GPS receiver on the UAV (100) and piloting (410) the UAV, under control of a navigation computer on the UAV, from the starting position to the waypoint in accordance with a navigation algorithm (416). Methods of piloting a UAV according to a navigation algorithm are discussed in detail below in this specification.

While piloting the UAV from the starting position to the waypoint, the method of FIG. 4 also includes reading (418) from the GPS receiver a sequence of GPS data representing a flight path of the UAV and depicting (420) the flight of the UAV with 3D computer graphics, including a computer graphic display of a satellite image of the Earth, in dependence upon the GPS data. In the method of FIG. 4, depicting (420) the flight of the UAV includes determining (444) a display attitude of the UAV in dependence upon the sequence of GPS data. Display attitude is not based upon actual attitude data such as would be had from gyro sensors, for example. In this disclosure, 'display attitude' refers to data describing orientation of a display image depicting a flight. The display attitude describes flight orientation in terms of roll, pitch, and yaw values derived from GPS data, not from measures of actual roll, pitch, and yaw.

In the method of FIG. 4, determining (444) a display attitude of the UAV in dependence upon the sequence of GPS data typically also includes detecting changes in the UAV's course from the sequence of GPS data and determining a display roll angle in dependence upon the detected course changes. In some embodiments, a sequence of GPS locations is used to calculate a rate of change of course, a value measured in degrees per second. In such embodiments, display roll angle often is then determined linearly according to the rate of course change, so that a displayed angle of the wings on a UAV icon on a GUI display is proportional to the rate of course change. The faster the course change, the steeper the display roll angle.

It is useful to note, however, that there is no required relationship between course change rate and display attitude. Embodiments of UAV navigation systems according to embodiments of the present invention may utilize no data whatsoever describing or representing the actual physical flight attitude of a UAV. The determinations of 'display attitude' are determination of values for data structures affecting a GUI display on a computer, not depictions of actual UAV attitude. To the extent that display attitudes are determined in calculated linear relations to actual position changes or course change rates, such display attitudes may result in displays that model fairly closely the actual flight attitude of a UAV. This is not a limitation of the invention, however. In fact, in some embodiments there is no attempt at all to determine display attitudes that closely model actual flight attitudes. Some embodiments consider it sufficient, for example, upon detecting a clockwise turn, always to simply assign a display roll angle of thirty degrees without more. Such embodiments do give a visual indication of roll, thereby indicating a turn, but they do not attempt to indicate an actual rate of change by varying the roll angle.

In the method of FIG. 4, determining (444) a display attitude of the UAV in dependence upon the sequence of GPS data may also include detecting changes in the UAV's course from the sequence of GPS data and determining a display yaw angle in dependence upon the detected course changes. In the method of FIG. 4, determining (444) a display attitude of the UAV in dependence upon the sequence of GPS data may also include detecting changes in the UAV's altitude from the sequence of GPS data and determining a display pitch angle in dependence upon the detected altitude changes.

Figure 4A:
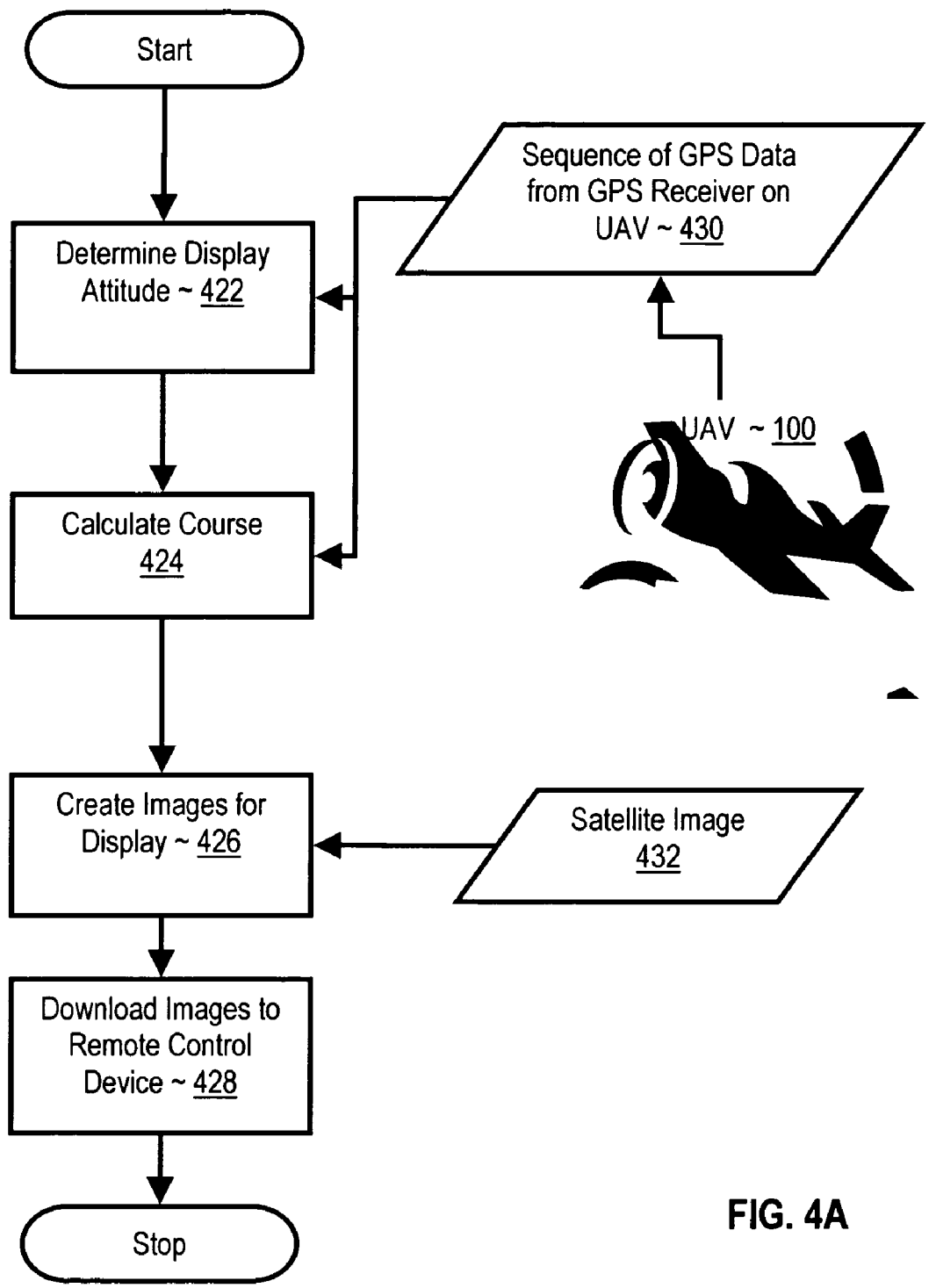
FIG. 4A sets forth a flow chart illustrating an exemplary method of depicting the flight of the UAV.

FIG. 4A sets forth a flow chart illustrating an exemplary method of depicting the flight of the UAV. In the method of FIG. 4A, depicting the flight of the UAV includes determining (422), on the UAV, a display attitude of the UAV in dependence upon the sequence of GPS data (430). In the method of FIG. 4A, depicting the flight of the UAV includes calculating (424), on the UAV, from the sequence of GPS data, the UAV's course. In the method of FIG. 4A, depicting the flight of the UAV includes creating (426), on the UAV, images for display in dependence upon the display attitude, the course, and a satellite image (432) stored on the UAV and downloading (428) the images for display from the UAV to the remote control device.

Figure 4B:
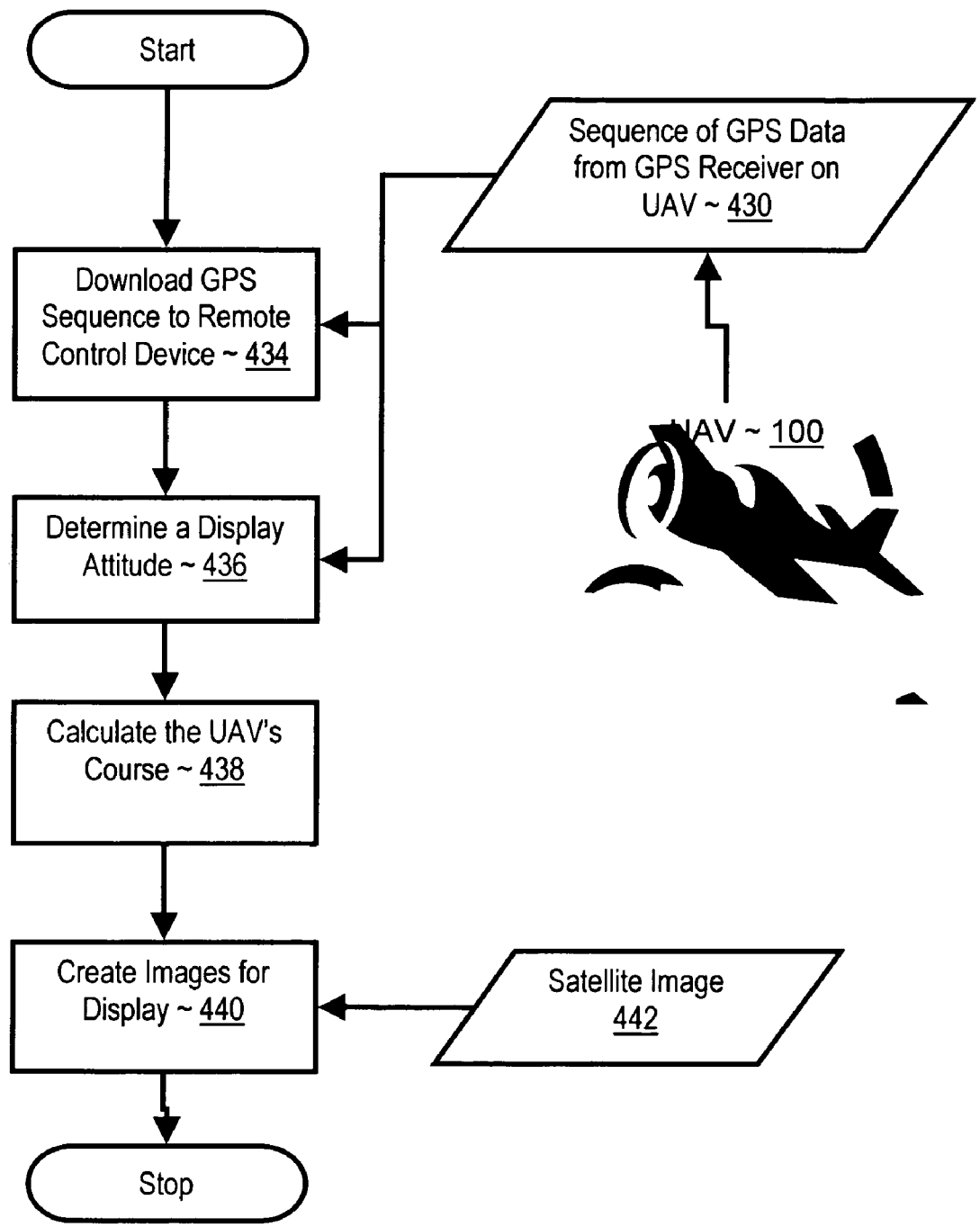
FIG. 4B sets forth a flow chart illustrating another exemplary method of depicting the flight of the UAV.

FIG. 4B sets forth a flow chart illustrating another exemplary method of depicting the flight of the UAV. In the method of FIG. 4B, depicting the flight of the UAV includes downloading (434) the GPS sequence (430) from the UAV (100) to the remote control device and determining (436), in the remote control device, a display attitude of the UAV in dependence upon the sequence of GPS data. In the method of FIG. 4B, depicting the flight of the UAV includes calculating (438), in the remote control device, from the sequence of GPS data, the UAV's course. In the method of FIG. 4B, depicting the flight of the UAV includes creating (440), in the remote control device, images for display in dependence upon the display attitude, the course, and a satellite image (442) stored on the remote control device.

Whether the images for display are created on the UAV or on the remote control device, UAV navigation systems according to embodiments of the present invention typically create images for display by use of 3D graphics rendering engines. One example of such an engine is DarkBasic™, from Enteractive Software, Inc., of Hartford, Conn. This example is discussed in terms of DarkBasic, but the use of DarkBasic is not a limitation of the present invention. Many other 3D graphics engines may be used, including APIs for OpenGL, DirectX, Direct3D, and others as will occur to those of skill in the art.

DarkBasic provides its API as an extended version of the Basic programming language for orienting a view of a JPEG map of the Earth's surface in accordance with data describing the location of a UAV over the Earth and the UAV's attitude in terms of roll, pitch, yaw, and course. Satellite images of the Earth's surface in the form of JPEG maps suitable for use in DarkBasic rendering engines are available, for example, from Satellite Imaging Corporation of Houston, Tex. The DarkBasic API commands "GET IMAGE" and "LOAD IMAGE" import JPEG images into a DarkBasic rendering engine.

DarkBasic "CAMERA" commands are used to orient a view of a JPEG map. The DarkBasic command "POSITION CAMERA" may be used to set an initial view position to a starting point and to move the view position to new locations in dependence upon a sequence GPS data. The DarkBasic command "POINT CAMERA" may be used to orient the view to a UAV's course. When display attitudes are determined according to methods of the current invention, the DarkBasic commands "TURN CAMERA LEFT" and "TURN CAMERA RIGHT" may be used to orient the view according to display yaw angle; the DarkBasic commands "PITCH CAMERA UP" and "PITCH CAMERA DOWN" may be used to orient the view according to display pitch angle; and the DarkBasic commands "ROLL CAMERA LEFT" and "ROLL CAMERA RIGHT" may be used to orient the view according to display roll angle.

Macros

Although the flow chart of FIG. 4 illustrates navigating a UAV to a single waypoint, as a practical matter, embodiments of the present invention support navigating a UAV along a route having many waypoints, including a final waypoint and one or more intermediate waypoints. That is, methods of the kind illustrated in FIG. 4 may also include receiving user selections of a multiplicity of GUI map pixels representing waypoints, where each pixel has a location on the GUI and mapping each pixel location to Earth coordinates of a waypoint.

Such methods of navigating a UAV can also include assigning one or more UAV instructions to each waypoint and transmitting the coordinates of the waypoints and the UAV instructions to the UAV. A UAV instruction typically includes one or more instructions for a UAV to perform a task in connection with a waypoint. Exemplary tasks include turning on or off a camera installed on the UAV, turning on or off a light installed on the UAV, orbiting a waypoint, or any other task that will occur to those of skill in the art.

Such exemplary methods of navigating a UAV also include storing the coordinates of the waypoints and the UAV instructions in computer memory on the UAV, piloting the UAV to each waypoint in accordance with one or more navigation algorithms, and operating the UAV at each waypoint in accordance with the UAV instructions for each waypoint. UAV instructions to perform tasks in connection with a waypoint may be encoded in, for example, XML (the eXtensible Markup Language) as shown in the following exemplary XML segment:

```
<UAV-Instructions>
   <macro>
      <waypoint> 33°44' 10" N 30° 15' 50" W</waypoint>
      <instruction> orbit </instruction>
      <instruction> videoCameraON </instruction>
      <instruction> wait30 minutes </instruction>
      <instruction> videoCameraOFF </instruction>
      <instruction> nextWaypoint </instruction>
   </macro>
   <macro></macro>
   <macro></macro>
   <macro></macro>
<UAV-instructions>
```

This XML example has a root element named 'UAV-instructions.' The example contains several subelements named 'macro.' One 'macro' subelement contains a waypoint location representing an instruction to fly to 33° 44' 10" N 30° 15' 50" W.

That macro subelement also contains several instructions for tasks to be performed when the UAV arrives at the waypoint coordinates, including orbiting around the waypoint coordinates, turning on an on-board video camera, continuing to orbit for thirty minutes with the camera on, turning off the video camera, and continuing to a next waypoint. Only one macro set of UAV instructions is shown in this example, but that is not a limitation of the invention. In fact, such sets of UAV instructions may be of any useful size as will occur to those of skill in the art.

Pixel Mapping

Figure 5:
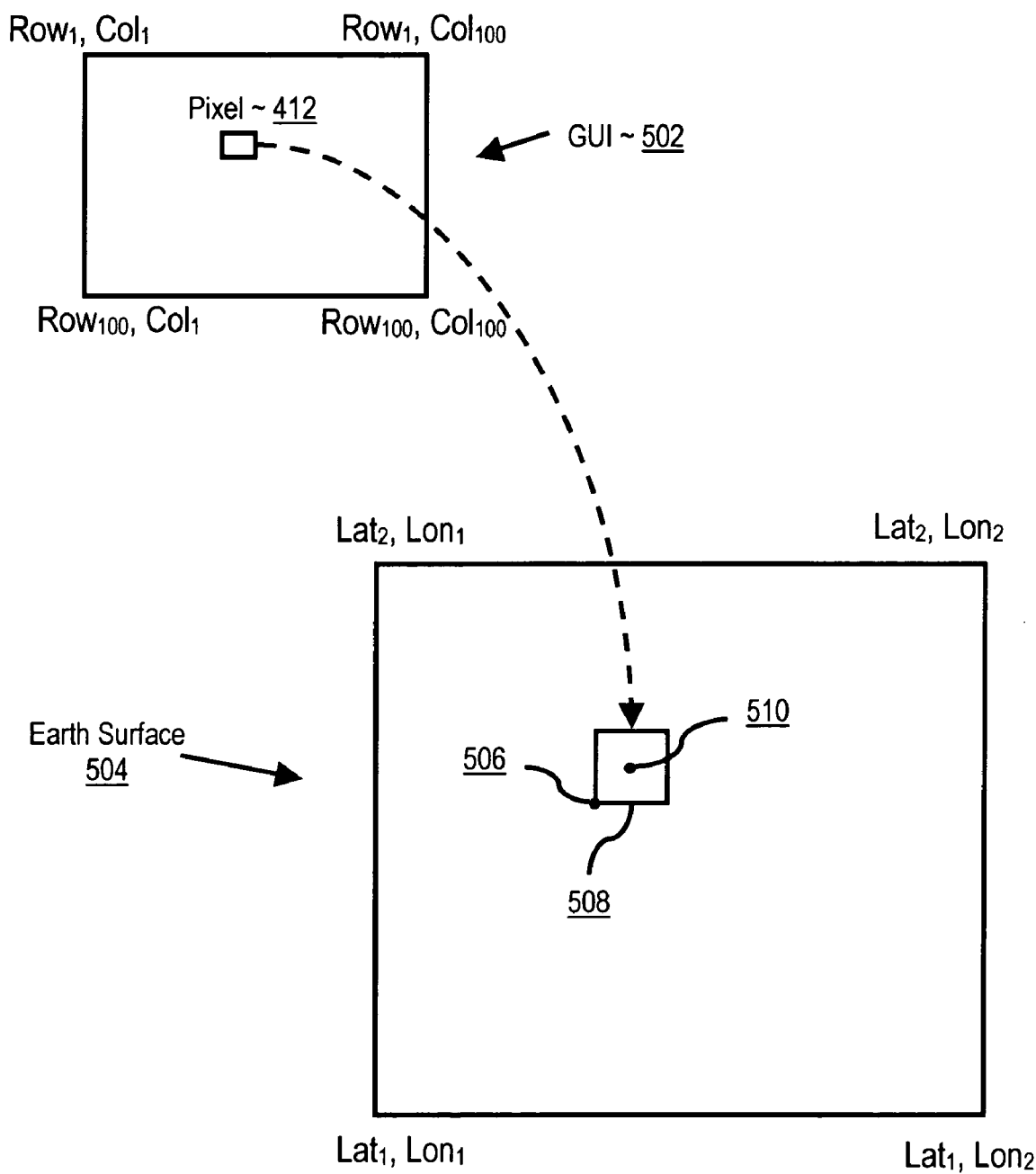
FIG. 5 sets forth a block diagram that includes a GUI displaying a map and a corresponding area of the surface of the Earth.

For further explanation of the process of mapping pixels' locations to Earth coordinates, FIG. 5 sets forth a block diagram that includes a GUI (502) displaying a map (not shown) and a corresponding area of the surface of the Earth (504). The GUI map has pixel boundaries identified as $Row_1, Col_1$; $Row_1, Col_{100}$; $Row_{100}, Col_{100}$; and $Row_{100}, Col_1$. In this example, the GUI map is assumed to comprise 100 rows of pixels and 100 columns of pixels. This example of 100 rows and columns is presented for convenience of explanation; it is not a limitation of the invention. GUI maps according to embodiments of the present invention may include any number of pixels as will occur to those of skill in the art.

The illustrated area of the surface of the Earth has corresponding boundary points identified as $Lat_1, Lon_1$; $Lat_1, Lon_2$; $Lat_2, Lon_2$; and $Lat_2, Lon_1$. This example assumes that the distance along one side of surface area (504) is 100 nautical miles, so that the distance expressed in terms of latitude or longitude between boundary points of surface area (504) is 100 minutes or 1° 40'.

In typical embodiments, mapping a pixel's location on the GUI to Earth coordinates of a waypoint includes mapping pixel boundaries of the GUI map to Earth coordinates. In this example, the GUI map boundary at $Row_1, Col_1$ maps to the surface boundary point at $Lat_1, Lon_1$; the GUI map boundary at $Row_1, Col_2$ maps to the surface boundary point at $Lat_1, Lon_2$; the GUI map boundary at $Row_2, Col_2$ maps to the surface boundary point at $Lat_2, Lon_2$; the GUI map boundary at $Row_2, Col_1$ maps to the surface boundary point at $Lat_2, Lon_1$.

Mapping a pixel's location on the GUI to Earth coordinates of a waypoint typically also includes identifying a range of latitude and a range of longitude represented by each pixel. The range of latitude represented by each pixel may be described as $(Lat_2-Lat_1)/N_{rows}$, where $(Lat_2-Lat_1)$ is the length in degrees of the vertical side of the corresponding surface (504), and $N_{rows}$ is the number of rows of pixels. In this example, $(Lat_2-Lat_1)$ is 1° 40' or 100 nautical miles, and $N_{rows}$ is 100 rows of pixels. The range of latitude represented by each pixel in this example therefore is one minute of arc or one nautical mile.

Similarly, the range of longitude represented by each pixel may be described as $(Lon_2-Lon_1)/N_{cols}$, where $(Lon_2-Lon_1)$ is the length in degrees of the horizontal side of the corresponding surface (504), and $N_{cols}$ is the number of columns of pixels. In this example, $(Lon_2-Lon_1)$ is 1° 40' or 100 nautical miles, and $N_{cols}$ is 100 columns of pixels. The range of longitude represented by each pixel in this example therefore is one minute of arc or one nautical mile.

Mapping a pixel's location on the GUI to Earth coordinates of a waypoint typically also includes locating a region on the surface of the Earth in dependence upon the boundaries, the ranges, and the location of the pixel on the GUI map. The region is the portion of the surface corresponding to the pixel itself. That region is located generally by multiplying in both dimensions, latitude and longitude, the range of latitude and longitude by column or row numbers of the pixel location on the GUI map. That is, a latitude for the surface region of interest is given by Expression 1.

$$Lat_1 + P_{row}((Lat_2-Lat_1)/N_{rows}) \qquad \text{(Exp. 1)}$$

In Expression 1:

$Lat_1$ is the latitude of an origin point for the surface area (504) corresponding generally to the GUI map, $P_{row}$ is the row number of the pixel location on the GUI map, and $((Lat_2-Lat_1)/N_{rows})$ is the range of latitude represented by the pixel.

Similarly, a longitude for the surface region of interest is given by Expression 2.

$$Lon_1 + P_{col}((Lon_2 - Lon_1)/N_{cols}) \quad (Exp. 2)$$

In Expression 2:
$Lon_1$ is the longitude of an origin point for the surface area (504) corresponding generally to the GUI map,
$P_{col}$ is the column number of the pixel location on the GUI map, and
$((Lon_2 - Lon_1)/N_{cols})$ is the range of longitude represented by the pixel.

Referring to FIG. 5 for further explanation, Expressions 1 and 2 taken together identify a region (508) of surface area (504) that corresponds to the location of pixel (412) mapping the pixel location to the bottom left corner (506) of the region (508). Advantageously, however, many embodiments of the present invention further map the pixel to the center of the region by adding one half of the length of the region's sides to the location of the bottom left corner (506).

More particularly, locating a region on the surface of the Earth in dependence upon the boundaries, the ranges, and the location of the pixel on the GUI map, as illustrated by Expression 3, may include multiplying the range of longitude represented by each pixel by a column number of the selected pixel, yielding a first multiplicand; and multiplying the range of longitude represented by each pixel by 0.5, yielding a second multiplicand; adding the first and second multiplicands to an origin longitude of the GUI map.

$$Lon_1 + P_{col}((Lon_2 - Lon_1)/N_{cols}) + 0.5((Lon_2 - Lon_1)/N_{cols}) \quad (Exp. 3)$$

In Expression 3, the range of longitude represented by each pixel is given by $((Lon_2 - Lon_1)/N_{cols})$, and the first multiplicand is $P_{col}((Lon_2 - Lon_1)/N_{cols})$. The second multiplicand is given by $0.5((Lon_2 - Lon_1)/N_{cols})$.

Similarly, locating a region on the surface of the Earth in dependence upon the boundaries, the ranges, and the location of the pixel on the GUI map, as illustrated by Expression 4, typically also includes multiplying the range of latitude represented by each pixel by a row number of the selected pixel, yielding a third multiplicand; multiplying the range of latitude represented by each pixel by 0.5, yielding a fourth multiplicand; and adding the third and fourth multiplicands to an origin latitude of the GUI map.

$$Lat_1 + P_{row}((Lat_2 - Lat_1)/N_{rows}) + 0.5((Lat_2 - Lat_1)/N_{rows})$$

In Expression 4, the range of latitude represented by each pixel is given by $((Lat_2 - Lat_1)/N_{rows})$, and the third multiplicand is $P_{row}((Lat_2 - Lat_1)/N_{rows})$. The fourth multiplicand is given by $0.5((Lat_2 - Lat_1)/N_{rows})$. Expressions 3 and 4 taken together map the location of pixel (412) to the center (510) of the located region (508).

Navigation on a Heading to a Waypoint

Figure 6:
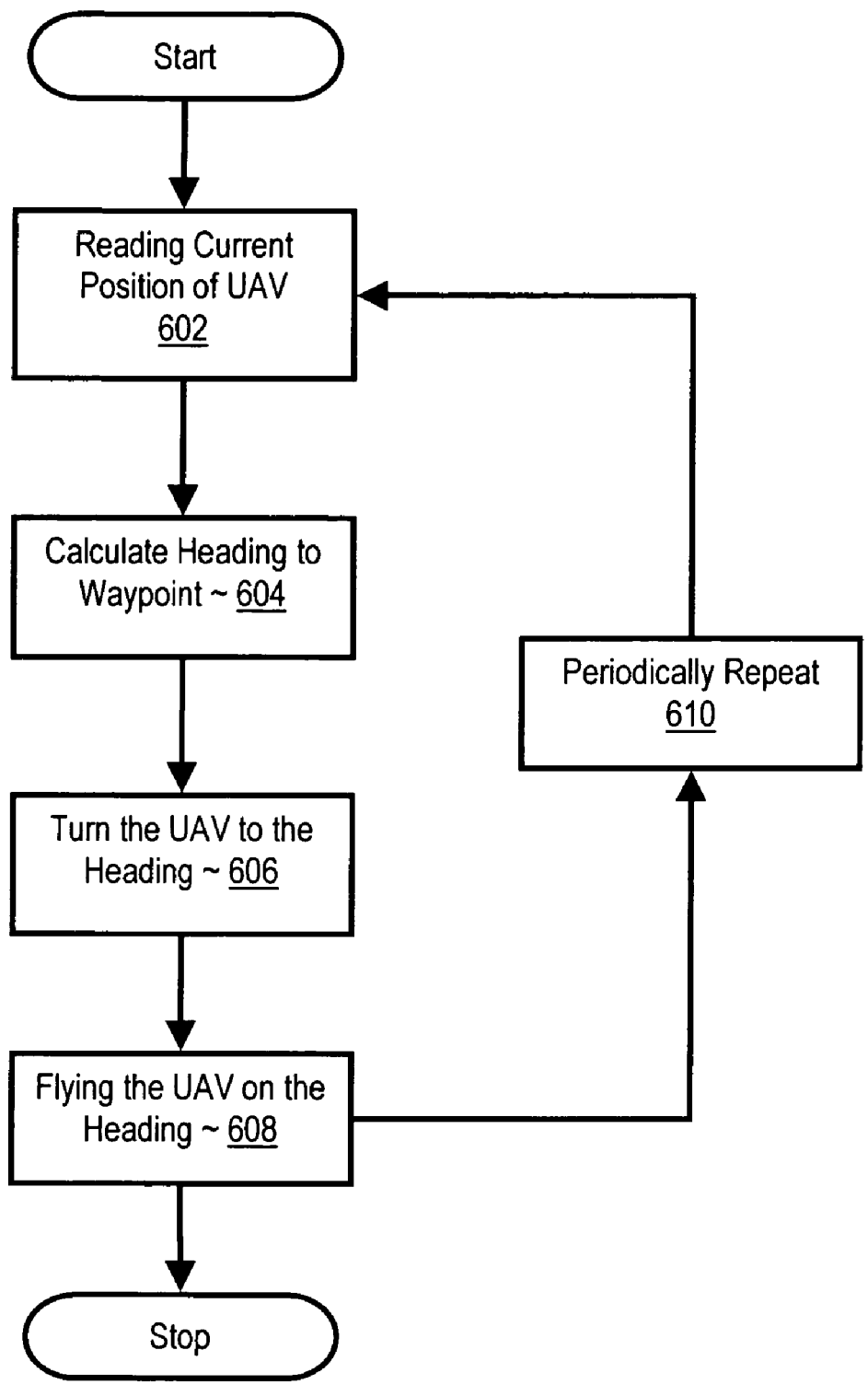
FIG. 6 sets forth a flow chart illustrating an exemplary method of piloting in accordance with a navigation algorithm.

An exemplary method of navigating in accordance with a navigation algorithm is explained with reference to FIGS. 6 and 7. FIG. 6 sets forth a flow chart illustrating an exemplary method of piloting in accordance with a navigation algorithm, and FIG. 7 sets forth a line drawing illustrating a flight path produced by application of the method of FIG. 6. The method of FIG. 6 includes periodically repeating (610) the steps of:
reading (602) from the GPS receiver a current position of the UAV;
calculating (604) a heading from the current position to the waypoint;
turning (606) the UAV to the heading; and
flying (608) the UAV on the heading.

In this method, if $Lon_1$, $Lat_1$ is taken as the current position, and $Lon_2$, $Lat_2$ is taken as the waypoint position, then the heading may be calculated generally as the inverse tangent of $((Lat_2 - Lat_1)/(Lon_2 - Lon_1))$.

Figure 7:
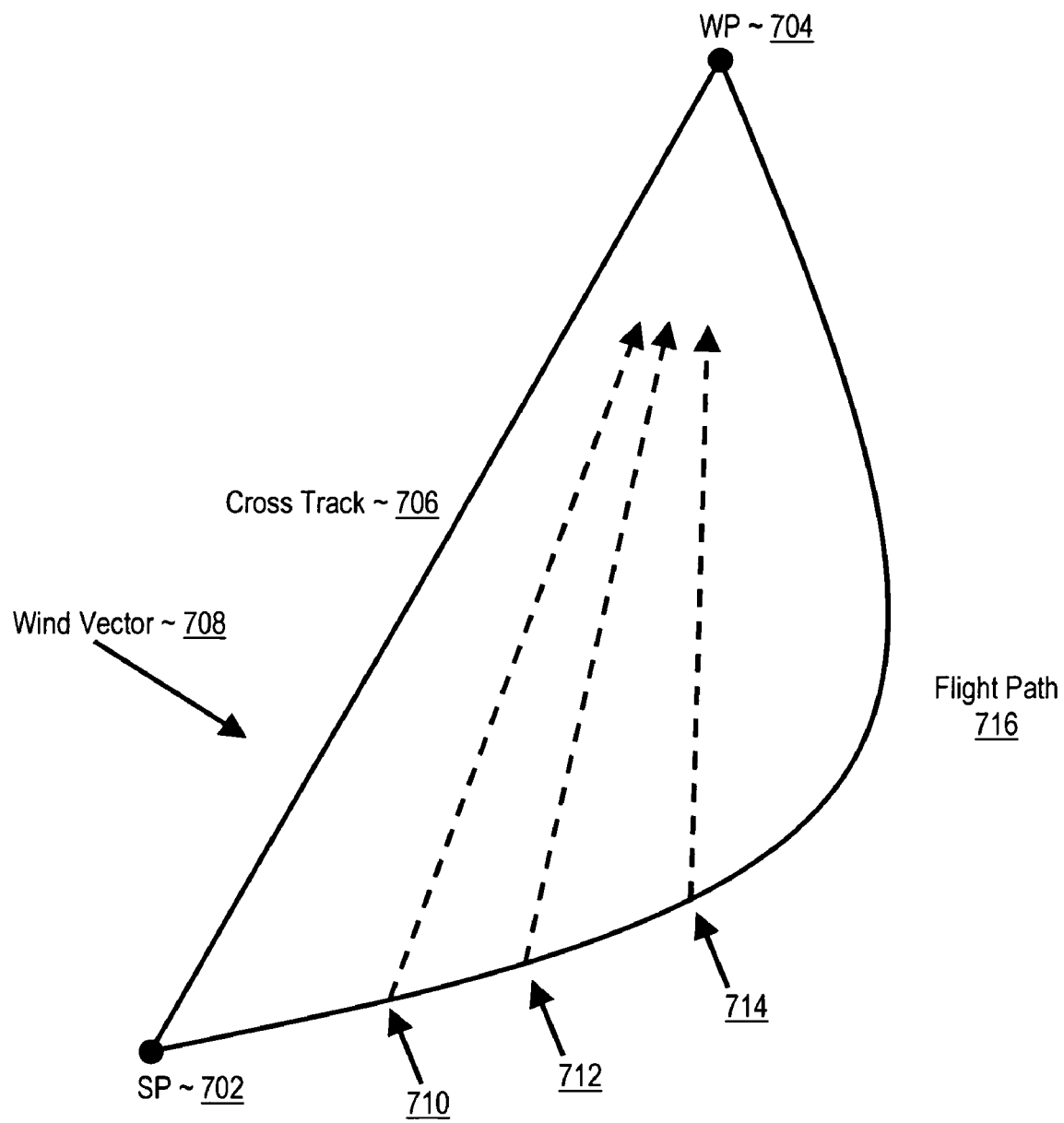
FIG. 7 sets forth a line drawing illustrating a flight path produced by application of the method of FIG. 6.

FIG. 7 shows the effect of the application of the method of FIG. 6. In the example of FIG. 7, a UAV is flying in a cross wind having cross wind vector (708). Curved flight path (716) results from periodic calculations according to the method of FIG. 6 of a new heading straight from a current location to the waypoint. FIG. 7 shows periodic repetitions of the method of FIG. 6 at plot points (710, 712, 714). For clarity of explanation, only three periodic repetitions are shown, although that is not a limitation of the invention. In fact, any number of periodic repetitions may be used as will occur to those of skill in the art.

Navigation with Headings Set to a Cross Track Direction

Figure 8:
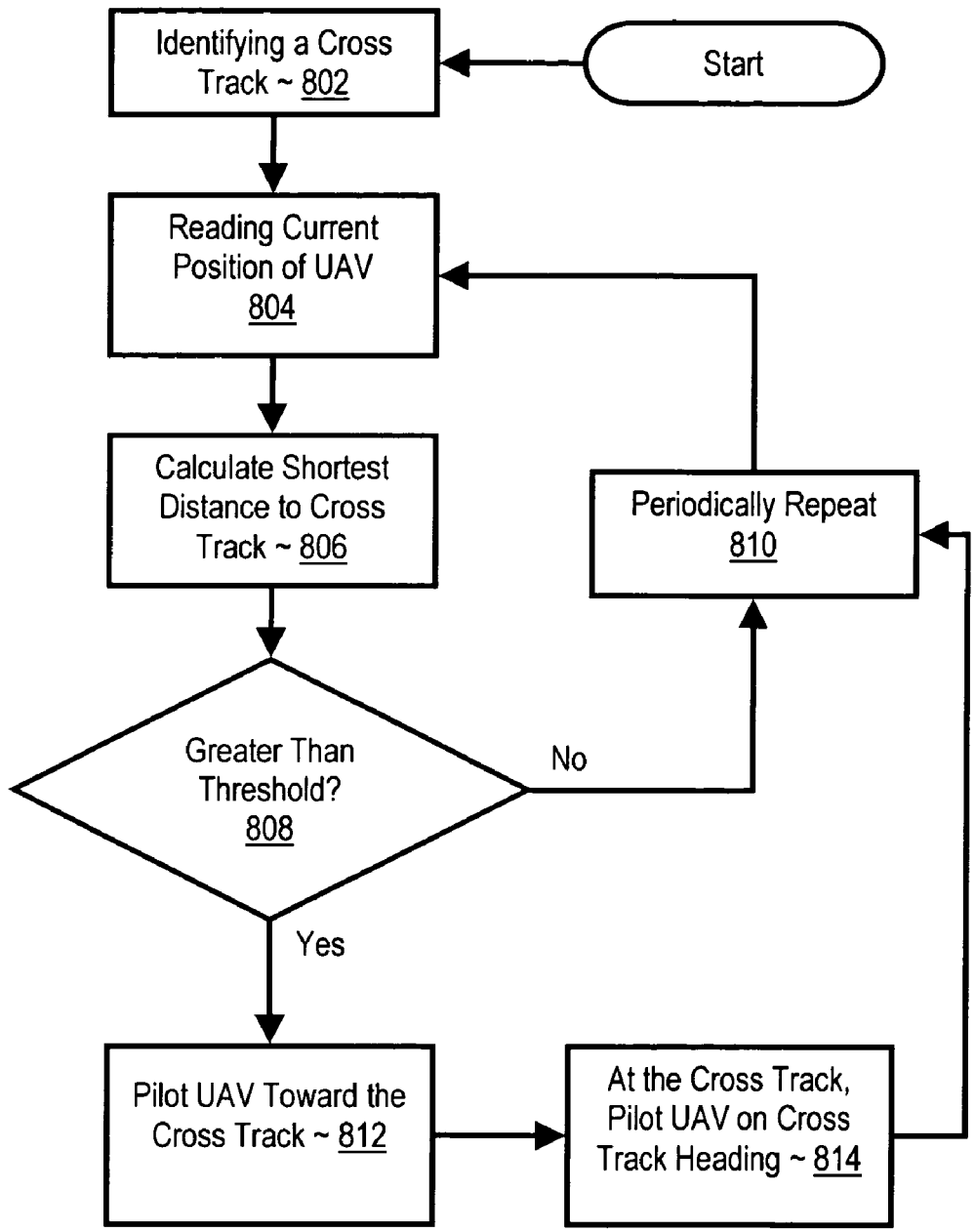
FIG. 8 sets forth a flow chart illustrating an exemplary method of piloting in accordance with a navigation algorithm.

A further exemplary method of navigating in accordance with a navigation algorithm is explained with reference to FIGS. 8 and 9. FIG. 8 sets forth a flow chart illustrating an exemplary method of piloting in accordance with a navigation algorithm, and FIG. 9 sets forth a line drawing illustrating a flight path produced by application of the method of FIG. 8.

The method of FIG. 8 includes identifying (802) a cross track between the starting point and the waypoint. A cross track is a fixed course from a starting point directly to a waypoint. If $Lon_1$, $Lat_1$ is taken as the position of a starting point, and $Lon_2$, $Lat_2$ is taken as the waypoint position, then a cross track is identified by $Lon_1$, $Lat_1$ and $Lon_2$, $Lat_2$. A cross track has a direction, a 'cross track direction,' that is the direction straight from a starting point to a waypoint, and it is often useful to characterize a cross track by its cross track direction. The cross track direction for a cross track identified by starting point $Lon_1$, $Lat_1$ and waypoint position $Lon_2$, $Lat_2$ may be calculated generally as the inverse tangent of $((Lat_2 - Lat_1)/(Lon_2 - Lon_1))$.

The method of FIG. 8 includes periodically repeating (810) the steps of: reading (804) from the GPS receiver a current position of the UAV; calculating (806) a shortest distance between the current position and the cross track; and if the shortest distance between the current position and the cross track is greater than a threshold distance, piloting (812) the UAV toward the cross track, and, upon arriving at the cross track, piloting (814) the UAV in a cross track direction toward the waypoint. FIG. 9 illustrates calculating a shortest distance between the current position and a cross track. In the example of FIG. 9, calculating a shortest distance between the current position and a cross track includes calculating the distance from a current position (912) to the waypoint (704). In the example of FIG. 9, the distance from the current position (912) to the waypoint (704) is represented as the length of line (914). For current position $Lon_1$, $Lat_1$ and waypoint position $Lon_2$, $Lat_2$, the distance from a current position (912) to the waypoint (704) is given by the square root of $(Lat_2 - Lat_1)^2 + (Lon_2 - Lon_1)^2$.

In this example, calculating a shortest distance between the current position and a cross track also includes calculating the angle (910) between a direction from the current position to the waypoint and a cross track direction. In the example of FIG. 9, the direction from the current position (912) to the waypoint (704) is represented as the direction of line (914). In the example of FIG. 9, the cross track direction is the direction of cross track (706). The angle between a direction from the current position to the waypoint and a cross track direction is the difference between those directions.

In the current example, calculating a shortest distance between the current position and a cross track also includes calculating the tangent of the angle between a direction from the current position to the waypoint and a cross track direction and multiplying the tangent of the angle by the distance from the current position to the waypoint.

Figure 9:
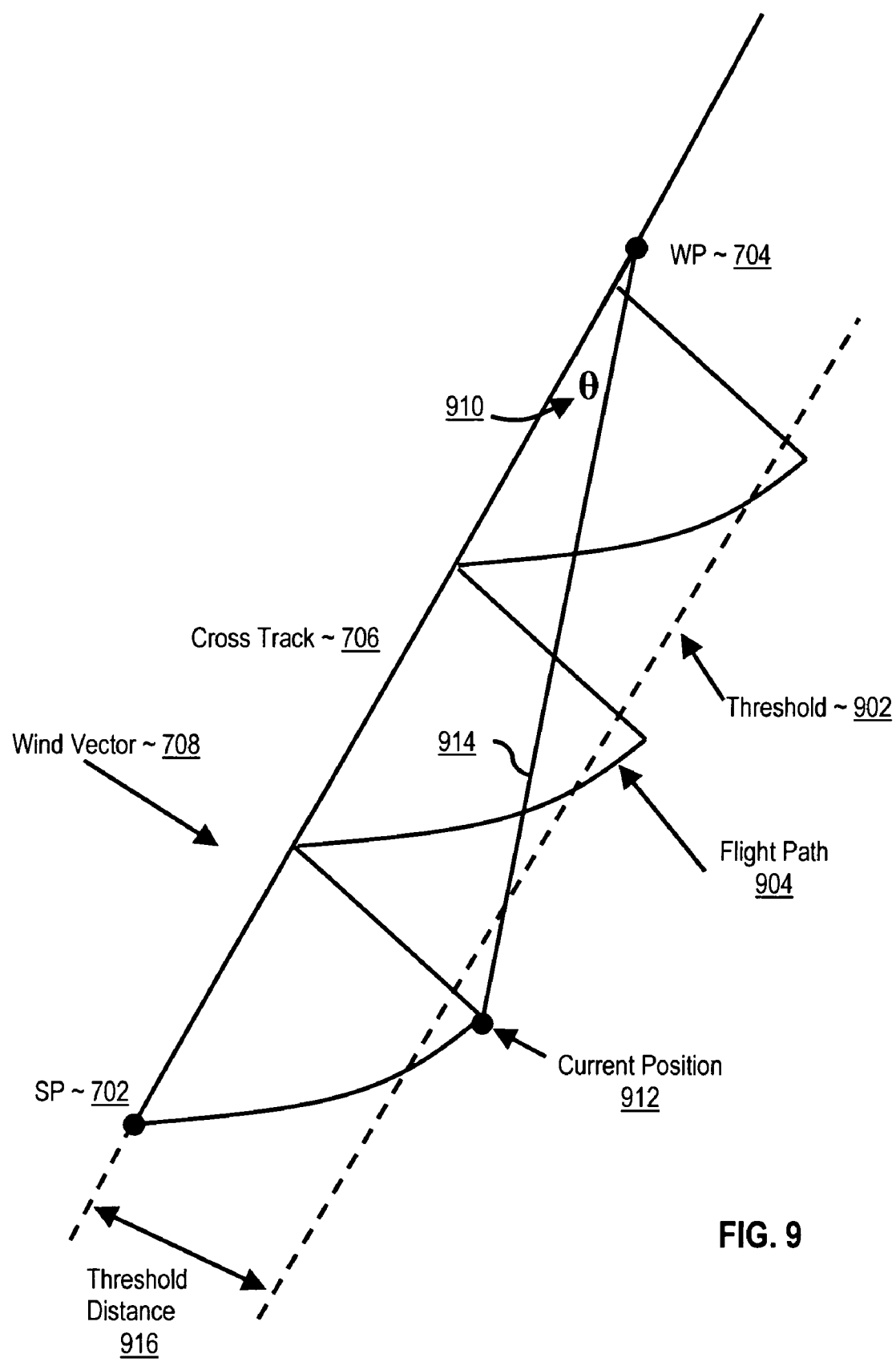
FIG. 9 sets forth a line drawing illustrating a flight path produced by application of the method of FIG. 8.

FIG. 9 also shows the effect of the application of the method of FIG. 8. In the example of FIG. 9, a UAV is flying in a cross wind having cross wind vector (708). Curved flight path (904) results from periodic calculations according to the method of FIG. 8 of a shortest distance between a current position and the cross track (706), flying the UAV back to the cross track and then in the direction of the cross track whenever the distance from the cross track exceeds a predetermined threshold distance.

Headings Set to Cross Track Direction with Angular Thresholds

Figure 10:
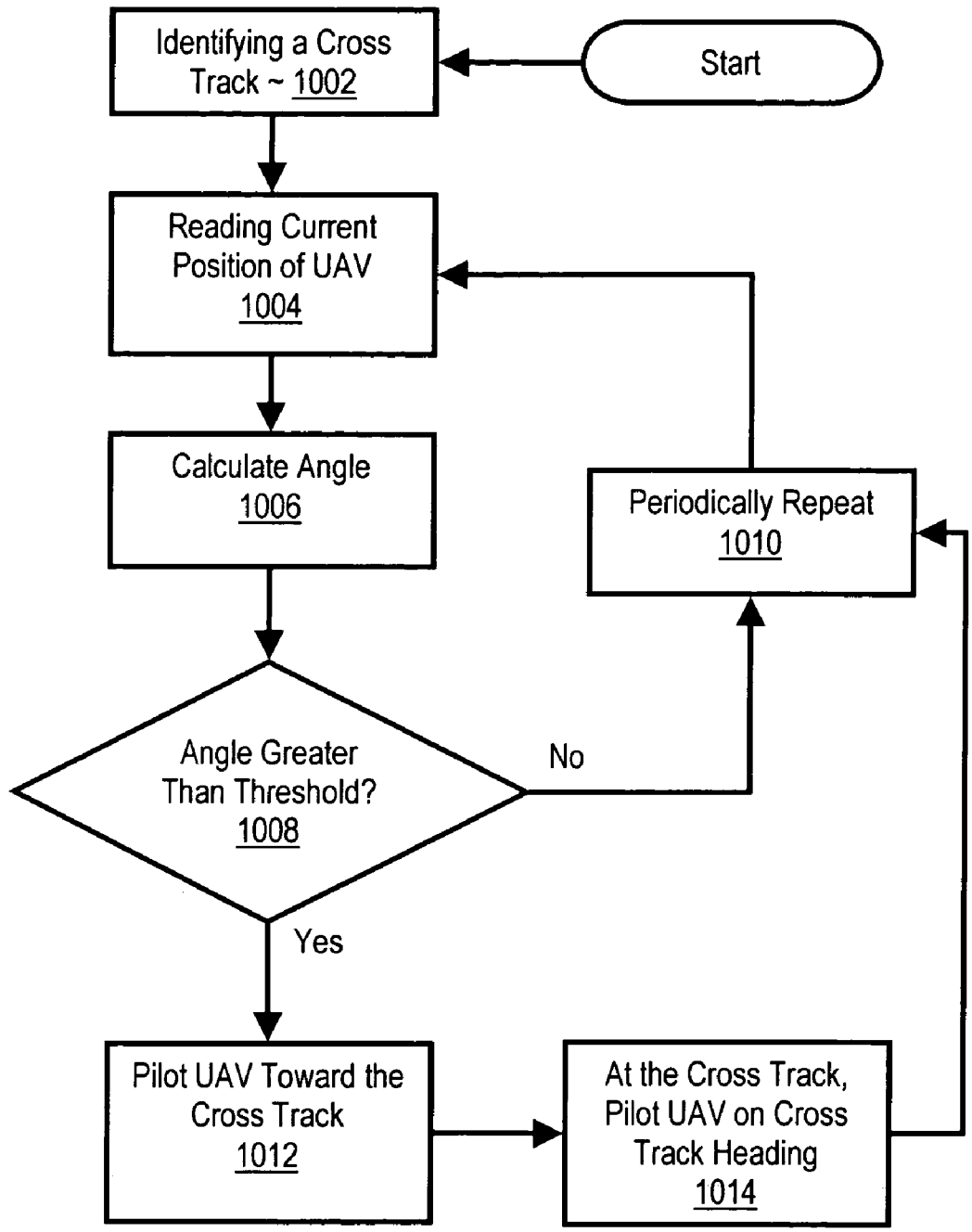
FIG. 10 sets forth a flow chart illustrating an exemplary method of piloting in accordance with a navigation algorithm.

A further exemplary method of navigating in accordance with a navigation algorithm is explained with reference to FIGS. 10 and 11. FIG. 10 sets forth a flow chart illustrating an exemplary method of piloting in accordance with a navigation algorithm, and FIG. 11 sets forth a line drawing illustrating a flight path produced by application of the method of FIG. 10.

In the method of FIG. 10, piloting in accordance with a navigation algorithm includes identifying (1002) a cross track having a cross track direction between the starting point and the waypoint. As described above, a cross track is identified by a position of a starting point and a waypoint position. For a starting point position of $Lon_1$, $Lat_1$ and a waypoint position of $Lon_2$, $Lat_2$, a cross track is identified by $Lon_1$, $Lat_1$ and $Lon_2$, $Lat_2$. In addition, it is often also useful to characterize a cross track by its cross track direction. The cross track direction for a cross track identified by starting point $Lon_1$, $Lat_1$ and waypoint position $Lon_2$, $Lat_2$ may be calculated generally as the inverse tangent of $((Lat_2-Lat_1)/(Lon_2-Lon_1))$.

In the method of FIG. 10, piloting in accordance with a navigation algorithm also includes repeatedly (1010) carrying out the steps of reading (1004) from the GPS receiver a current position of the UAV; calculating (1006) an angle between the direction from the current position to the waypoint and a cross track direction; and, if the angle is greater than a threshold angle, piloting (1012) the UAV toward the cross track, and, upon arriving at the cross track, piloting (1014) the UAV in the cross track direction. Piloting toward the cross track is carried out by turning to a heading no more than ninety degrees from the cross track direction, turning to the left if the current position is right of the cross track and to the right if the current position is left of the cross track. Piloting in the cross track direction means turning the UAV to the cross track direction and then flying straight and level on the cross track direction. That is, in piloting in the cross track direction, the cross track direction is set as the compass heading for the UAV.

Figure 11:
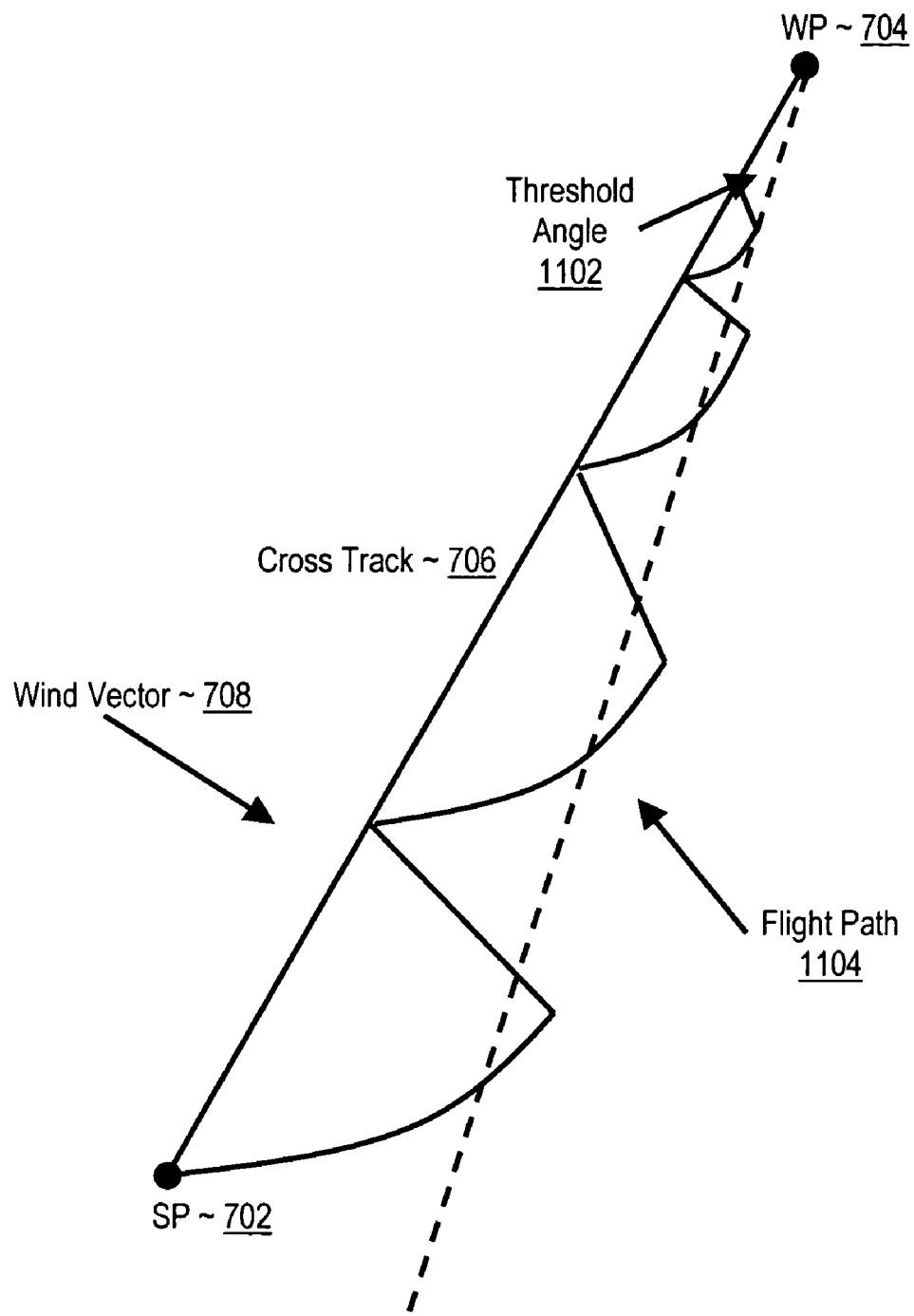
FIG. 11 sets forth a line drawing illustrating a flight path produced by application of the method of FIG. 10.

FIG. 11 shows the effect of the application of the method of FIG. 10. In the example of FIG. 11, a UAV is flying in a cross wind having cross wind vector (708). Curved flight path (1104) results from periodically flying the UAV, according to the method of FIG. 10, back to the cross track and then in the direction of the cross track whenever an angle between the direction from the current position to the waypoint and a cross track direction exceeds a predetermined threshold angle.

In many embodiments of the method of FIG. 10, the threshold angle is a variable whose value varies in dependence upon a distance between the UAV and the waypoint. In typical embodiments that vary the threshold angle, the threshold angle is increased as the UAV flies closer to the waypoint. It is useful to increase the threshold angle as the UAV flies closer to the waypoint to reduce the risk of excessive 'hunting' on the part of the UAV. That is, because the heading is the cross track direction, straight to the WP rather than cross wind, if the angle remains the same, the distance that the UAV needs to be blown off course to trigger a return to the cross track gets smaller and smaller until the UAV is flying to the cross track, turning to the cross track direction, getting blown immediately across the threshold, flying back the cross track, turning to the cross track direction, getting blown immediately across the threshold, and so on, and so on, in rapid repetition. Increasing the threshold angle as the UAV flies closer to the waypoint increases the lateral distance available for wind error before triggering a return to the cross track, thereby reducing this risk of excessive hunting.

Navigation on a Course to a Waypoint

Figure 12:
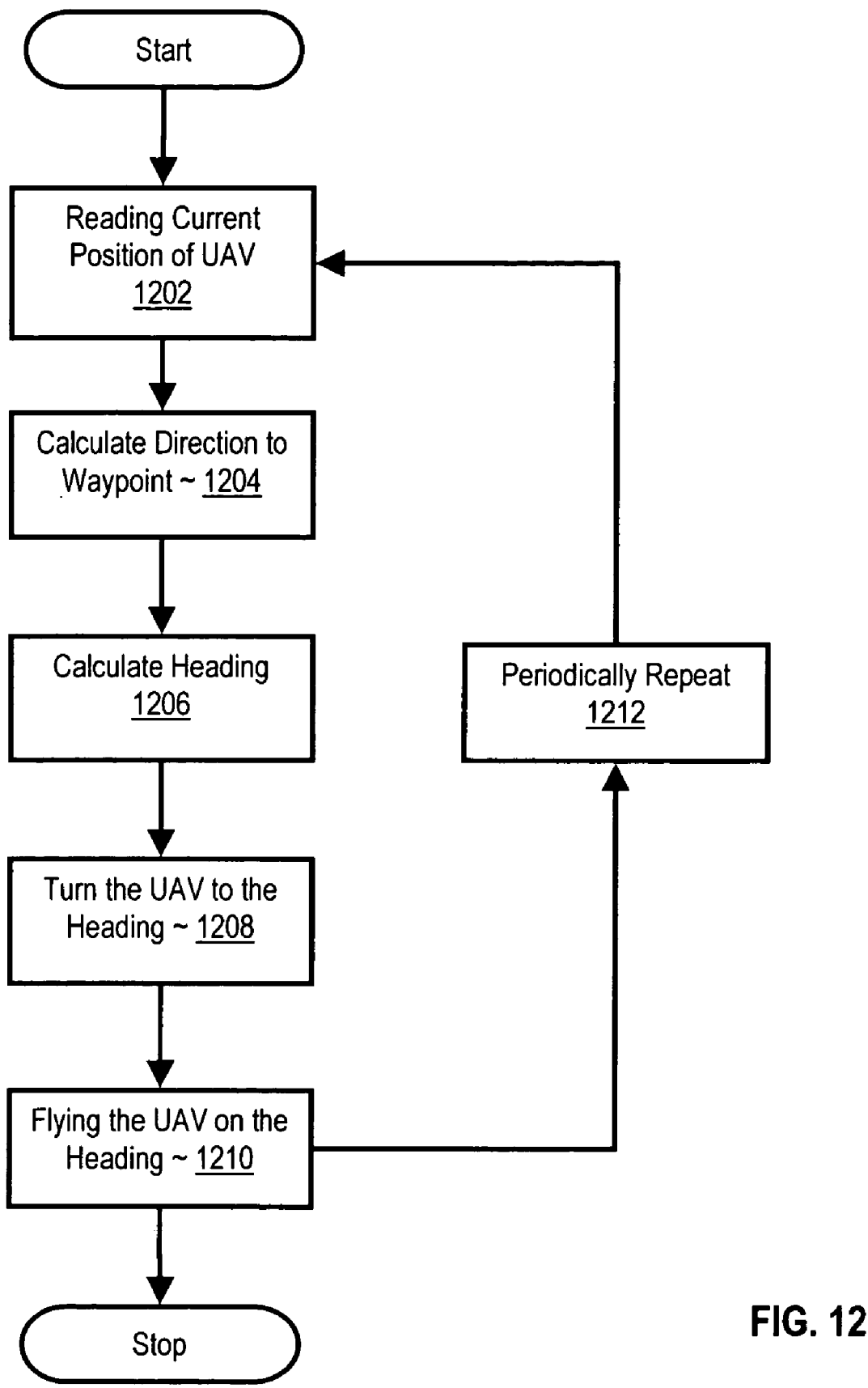
FIG. 12 sets forth a flow chart illustrating an exemplary method of piloting in accordance with a navigation algorithm.
Figure 12A:
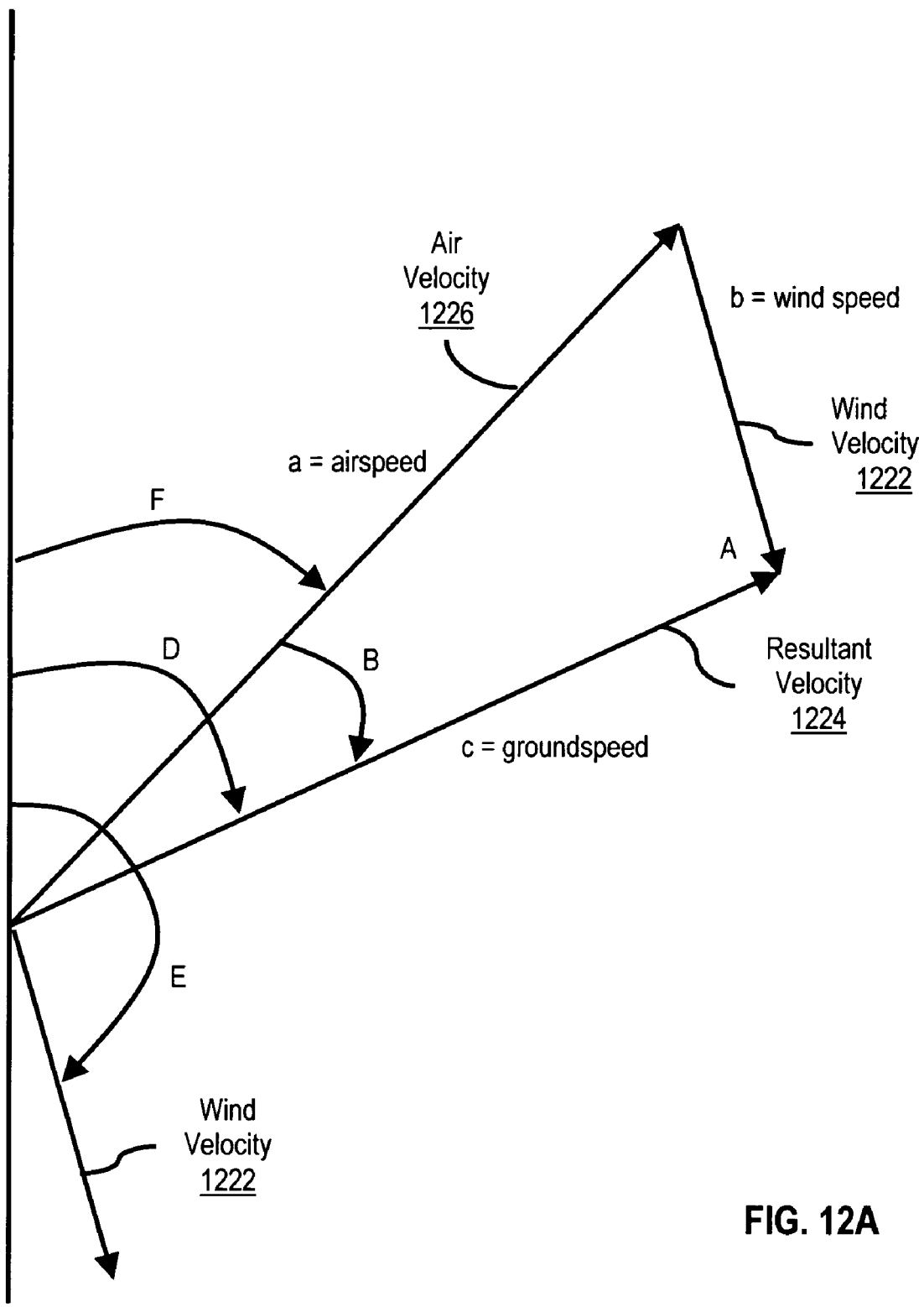
FIG. 12A sets forth a line drawing illustrating a method of calculating a heading with a cross wind to achieve a particular ground course.

A further exemplary method of navigating in accordance with a navigation algorithm is explained with reference to FIGS. 12, 12A, and 13. FIG. 12 sets forth a flow chart illustrating an exemplary method of piloting in accordance with a navigation algorithm. FIG. 12A sets forth a line drawing illustrating a method of calculating a heading with a cross wind to achieve a particular ground course. And FIG. 13 sets forth a line drawing illustrating a flight path produced by application of the method of FIG. 12.

In the method of FIG. 12, piloting in accordance with a navigation algorithm comprises periodically repeating (1212) the steps of reading (1202) from the GPS receiver a current position of the UAV; calculating (1204) a direction to the waypoint from the current position; calculating a heading in dependence upon wind speed, wind direction, airspeed, and the direction to the waypoint; turning (1208) the UAV to the heading; and flying (1210) the UAV on the heading.

FIG. 12A illustrates calculating (1206) a heading in dependence upon wind speed, wind direction, airspeed, and the direction to the waypoint. FIG. 12A sets forth a line drawing illustrating relations among several pertinent vectors, a wind velocity (1222), a resultant velocity (1224), and a UAV's air velocity (1226). A velocity vector includes a speed and a direction. These vectors taken together represent wind speed, wind direction, airspeed, and the direction to the waypoint. In the example of FIG. 12A, the angle B is a so-called wind correction angle, an angle which subtracted from (or added to, depending on wind direction) a direction to a waypoint yields a heading, a compass heading for a UAV to fly so that its resultant ground course is on a cross track. A UAV traveling at an airspeed of 'a' on heading (D–B) in the presence of a wind speed 'b' with wind direction E will have resultant ground speed 'c' in direction D.

In FIG. 12A, angle A represents the difference between the wind direction E and the direction to the waypoint D. In FIG. 12A, the wind velocity vector (1222) is presented twice, once to show the wind direction as angle E and again to illustrate angle A as the difference between angles E and D. Drawing wind velocity (1222) to form angle A with the resultant velocity (1224) also helps explain how to calculate wind correction angle B using the law of sines. Knowing two sides of a triangle and the angle opposite one of them, the angle opposite the other may be calculated, in this example, by $B=\sin^{-1}(b(\sin A)/a)$. The two known sides are airspeed 'a' and wind speed 'b.' The known angle is A, the angle opposite side 'a,' representing the difference between wind direction E and direction to the waypoint D. Calculating a heading, angle F on FIG. 12A, is then carried out by subtracting the wind correction angle B from the direction to the waypoint D.

Figure 13:
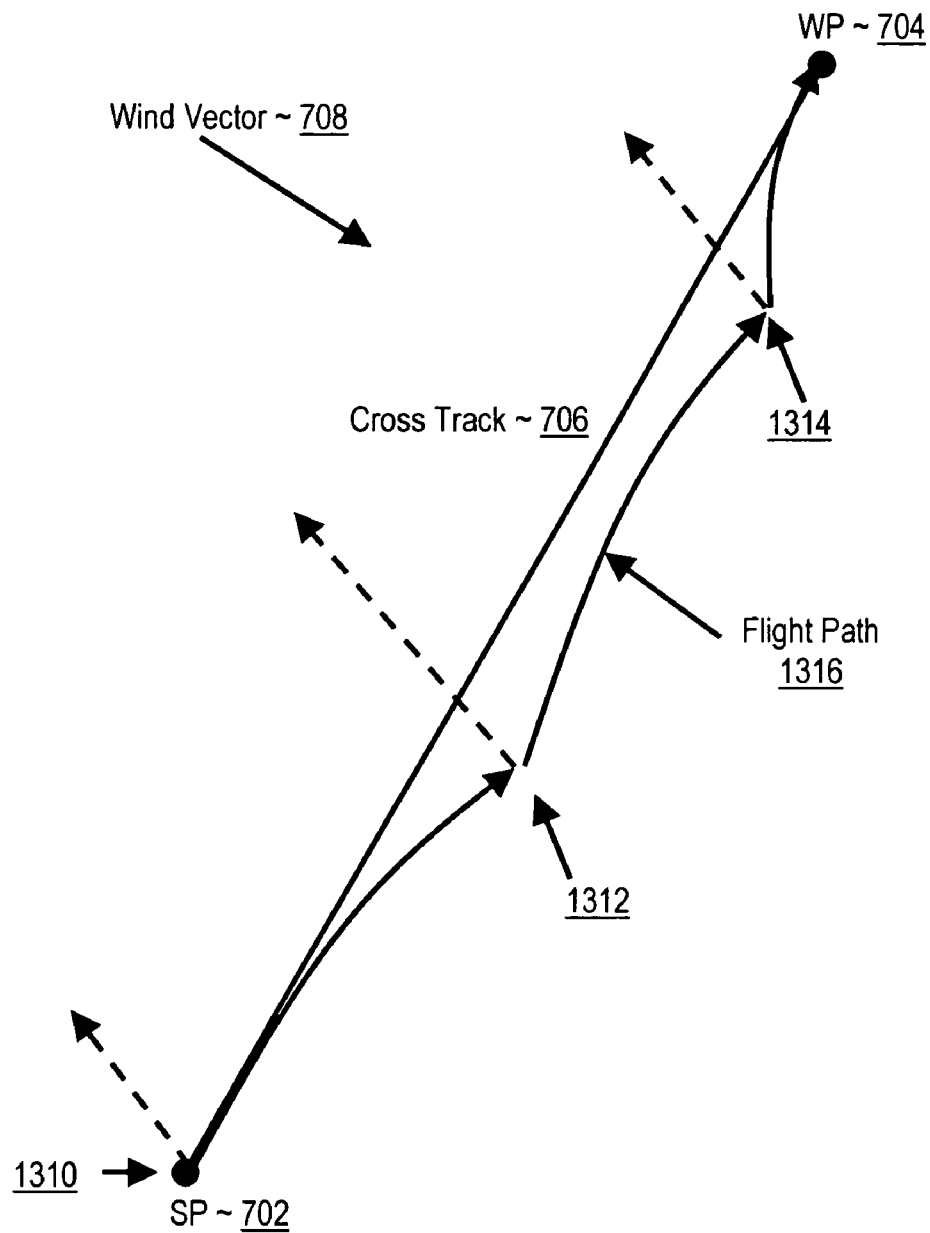
FIG. 13 sets forth a line drawing illustrating a flight path produced by application of the method of FIG. 12.

FIG. 13 shows the effect of the application of the method of FIG. 12. In the example of FIG. 13, a UAV is flying in a cross wind having cross wind vector (708). Curved flight path (1316) results from periodic calculations according to the method of FIG. 12 of a new heading straight whose resultant with a wind vector is a course straight from a current location to the waypoint. FIG. 13 shows periodic repetitions of the method of FIG. 12 at plot points (1310, 1312, 1314). For clarity of explanation, only three periodic repetitions are shown, although that is not a limitation of the invention. In fact, any number of periodic repetitions may be used as will occur to those of skill in the art.

Navigation on a Course set to a Cross Track Direction

Figure 14:
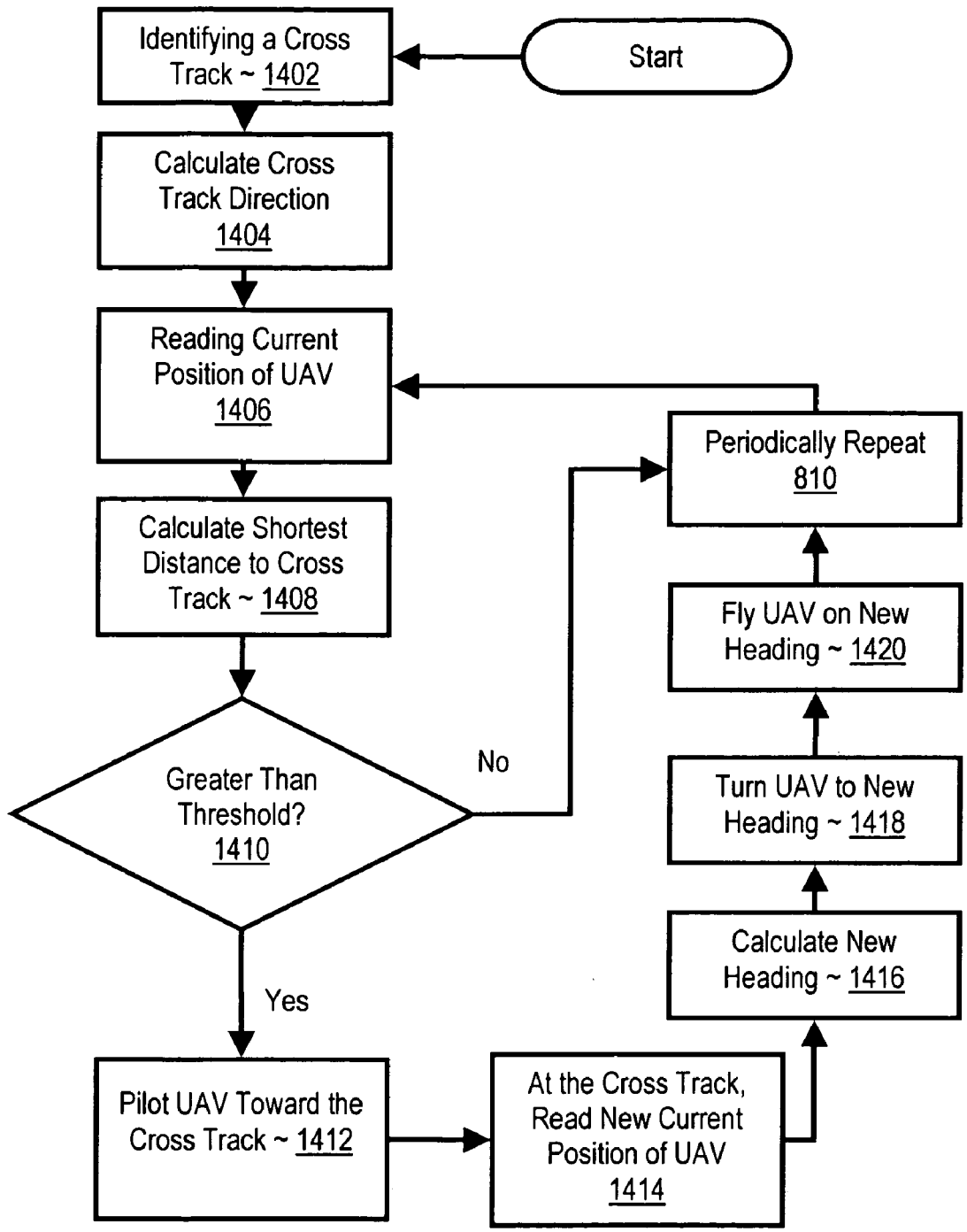
FIG. 14 sets forth a flow chart illustrating an exemplary method of piloting in accordance with a navigation algorithm.

A further exemplary method of navigating in accordance with a navigation algorithm is explained with reference to FIGS. 14 and 15. FIG. 14 sets forth a flow chart illustrating an exemplary method of piloting in accordance with a navigation algorithm, and FIG. 15 sets forth a line drawing illustrating a flight path produced by application of the method of FIG. 14.

The method of FIG. 14 includes identifying (1402) a cross track and calculating (1404) a cross track direction from the starting position to the waypoint. In the method of FIG. 14, piloting in accordance with a navigation algorithm is carried out by periodically repeating the steps of reading (1406) from the GPS receiver a current position of the UAV; calculating (1408) a shortest distance between the cross track and the current position; and, if the shortest distance between the cross track and the current position is greater than a threshold distance, piloting (1412) the UAV to the cross track. Upon arriving at the cross track, the method includes: reading (1414) from the GPS receiver a new current position of the UAV; calculating (1416), in dependence upon wind speed, wind direction, airspeed, and the cross track direction, a new heading; turning (1418) the UAV to the new heading; and flying (1420) the UAV on the new heading.

Figure 15:
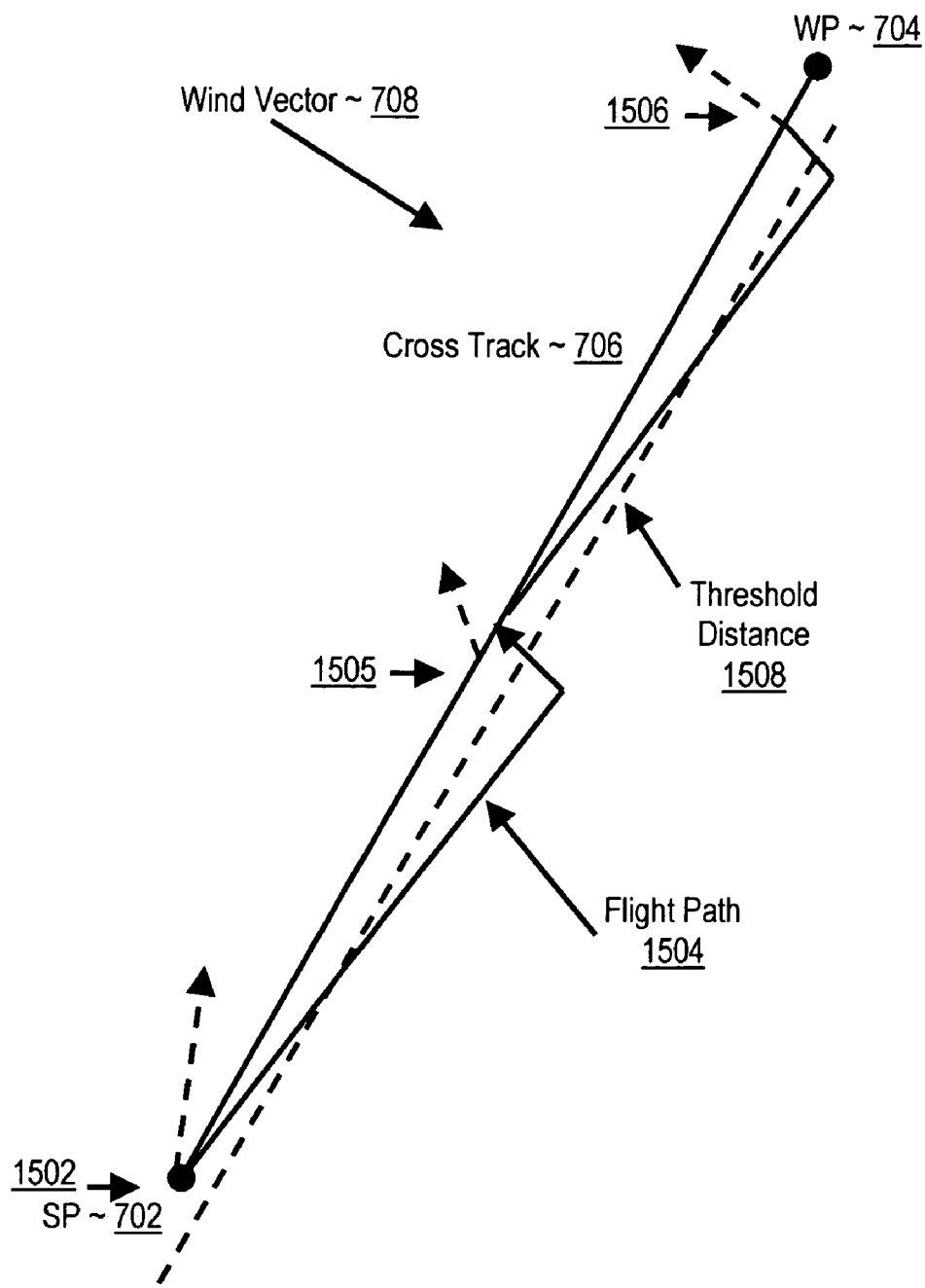
FIG. 15 sets forth a line drawing illustrating a flight path produced by application of the method of FIG. 14.

FIG. 15 shows the effect of the application of the method of FIG. 14. In the example of FIG. 15, a UAV is flying in a cross wind having cross wind vector (708). Curved flight path (1504) results from periodic calculations according to the method of FIG. 14 of a shortest distance between a current position and the cross track (706), flying the UAV back to the cross track, and, upon arriving at the cross track, calculating a new heading (1502, 1505, and 1506) and flying the UAV on the new heading.

Navigating a UAV with Obstacle Avoidance Algorithms

Successful navigation of a UAV often requires identifying and avoiding obstacles that would otherwise disrupt the flight of the UAV. Such obstacles may be physical three dimensional objects such as buildings, mountains, and others that will occur to those of skill in the art. Alternatively, obstacles may also be two dimensional geographic areas such as no-fly zones. A 'no-fly zone' is a geographic region over which the UAV is forbidden to fly.

Figure 16:
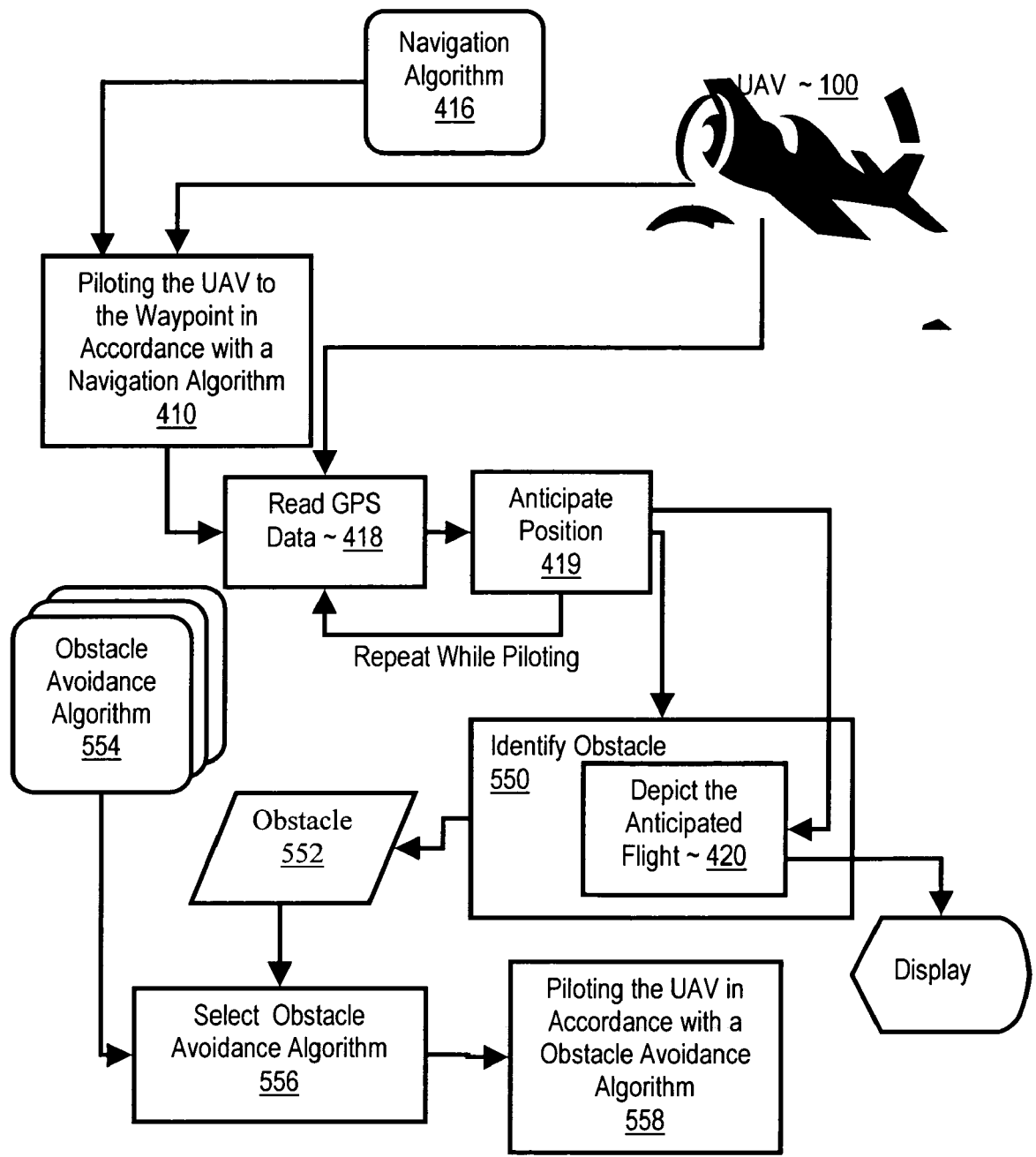
FIG. 16 sets forth a flow chart illustrating an exemplary method for navigating a UAV to avoid obstacles.

FIG. 16 sets forth a flow chart illustrating an exemplary method for navigating a UAV to avoid obstacles that includes piloting (410) the UAV (100), under control of a navigation computer, in accordance with a navigation algorithm (416). Piloting (410) the UAV (100) according to the method of FIG. 16 typically includes identifying flight control instructions to pilot the UAV according to a navigational algorithm and transmitting the flight control instructions to the UAV. Fight control instructions may be transmitted to the UAV from a navigation computer installed in a remote control device or may be transmitted to the UAV from a navigational computer installed on the UAV. Exemplary navigational algorithms are discussed above with reference to FIGS. 6–15 and such exemplary navigational algorithms, as well as others, are available for use with the method of FIG. 16.

While piloting the UAV, the method of FIG. 16 includes reading (418) from the GPS receiver a sequence of GPS data representing a flight of the UAV and anticipating (419) a future position of the UAV on the anticipated course. Anticipating (419) a future position of the UAV on the anticipated course is typically carried out by applying a formula to the current position of the UAV to anticipate one or more coordinates on an anticipated course to the destination waypoint. Anticipating (419) a future position of the UAV on the flight path is typically carried out in dependence upon the current heading of the UAV, the current environmental factors such as for example the current wind vector, macros dictating the flight of the UAV, and other factors as will occur to those of skill in the art. The anticipated future position of the UAV may be as close to the current UAV position as a few inches or feet ahead of the UAV, or may be miles ahead of the UAV.

The method of FIG. 16 also includes identifying (550) an obstacle (552) dependence upon the future position. One way of identifying (550) an obstacle (552) in dependence upon the future position is carried out by retrieving obstacle data describing potential obstacles from a database in dependence the future position. In such a database, obstacle information such as the location and dimensions of potential obstacles such as mountains, buildings, no-fly zones, and others are indexed by location. A UAV retrieves obstacle data describing the dimensions of a potential obstacle from the database in dependence upon the anticipated future position of the UAV and if the dimensions of the potential obstacle would disrupt the flight of the UAV, the potential obstacle is identified as an obstacle to be avoided by the method of FIG. 16.

Three-dimensional graphics are not only useful in depicting the flight of a UAV as described above, but such graphics are also useful in identifying and avoiding obstacles that would otherwise disrupt the flight of the UAV. Another way of identifying (550) an obstacle (552) therefore includes depicting (420) an anticipated flight of the UAV (100) with 3D computer graphics in dependence upon the future position of the UAV and identifying (550) an obstacle (552) in dependence upon the depiction of the anticipated flight. Depicting (420) an anticipated flight of the UAV (100) with 3D computer graphics may be carried out using the visualization graphics such as DarkBasic, OpenGL, DirectX, Direct3D, and others as will occur to those of skill in the art discussed above. Such a graphic depiction of the anticipated flight path often includes coalescing satellite images, with data describing potential obstacles. The 3D graphics may be displayed or may be left unrendered for analysis to identify an obstacle. That is, the 3D graphics do not have to be displayed to be useful in identifying an obstacle.

Identifying (550) an obstacle (552) on the anticipated course of the UAV (100) in dependence upon the depiction of the anticipated flight path may be carried out identifying an obstacle from unrendered three dimensional depiction such as by scanning the unrendered depiction for descriptions of obstacles. Alternatively, identifying (550) an obstacle (552) in the anticipated course of the UAV (100) in dependence upon the depiction of the anticipated flight may also be carried out by rendering and displaying the anticipated flight and analyzing the displayed depiction of the flight. Image recognition software may be used to compare objects in the displayed depiction of the anticipated flight with image models in a database for identification of obstacles. One example of image recognition software capable of modification for use in the method of FIG. 16 is SNV Vision currently available from Spikenet Technology.

After identifying an obstacle that would otherwise disrupt the flight of the UAV, the method of FIG. 16 includes selecting (556) an obstacle avoidance algorithm (554) and piloting (558) the UAV (100) in accordance with an obstacle avoidance algorithm. Identifying (550) an obstacle (552) on the anticipated course of the UAV (100) in dependence upon the depiction of the anticipated flight path may include identifying an algorithm useful in avoiding a two dimensional geographic area such as a no-fly zone. For further explanation, FIG. 17 sets forth a flow chart illustrating an exemplary method of piloting the UAV in accordance with an obstacle avoidance algorithm to avoid a no-fly zone. The method of FIG. 17 includes identifying (560) an intermediate waypoint (562) and flying (564) past the intermediate waypoint (562). One way of identifying (560) an intermediate waypoint (562) includes selecting a coordinate outside the no-fly zone. One way of selecting a coordinate outside the no-fly zone includes defining a bracket line running through the no-fly zone and then selecting a coordinate on the bracket line that is not within the no fly zone. A bracket line is a range of latitudes or longitudes that defines a line useful in selecting intermediate waypoints according to embodiments of the present invention.

Figure 17:
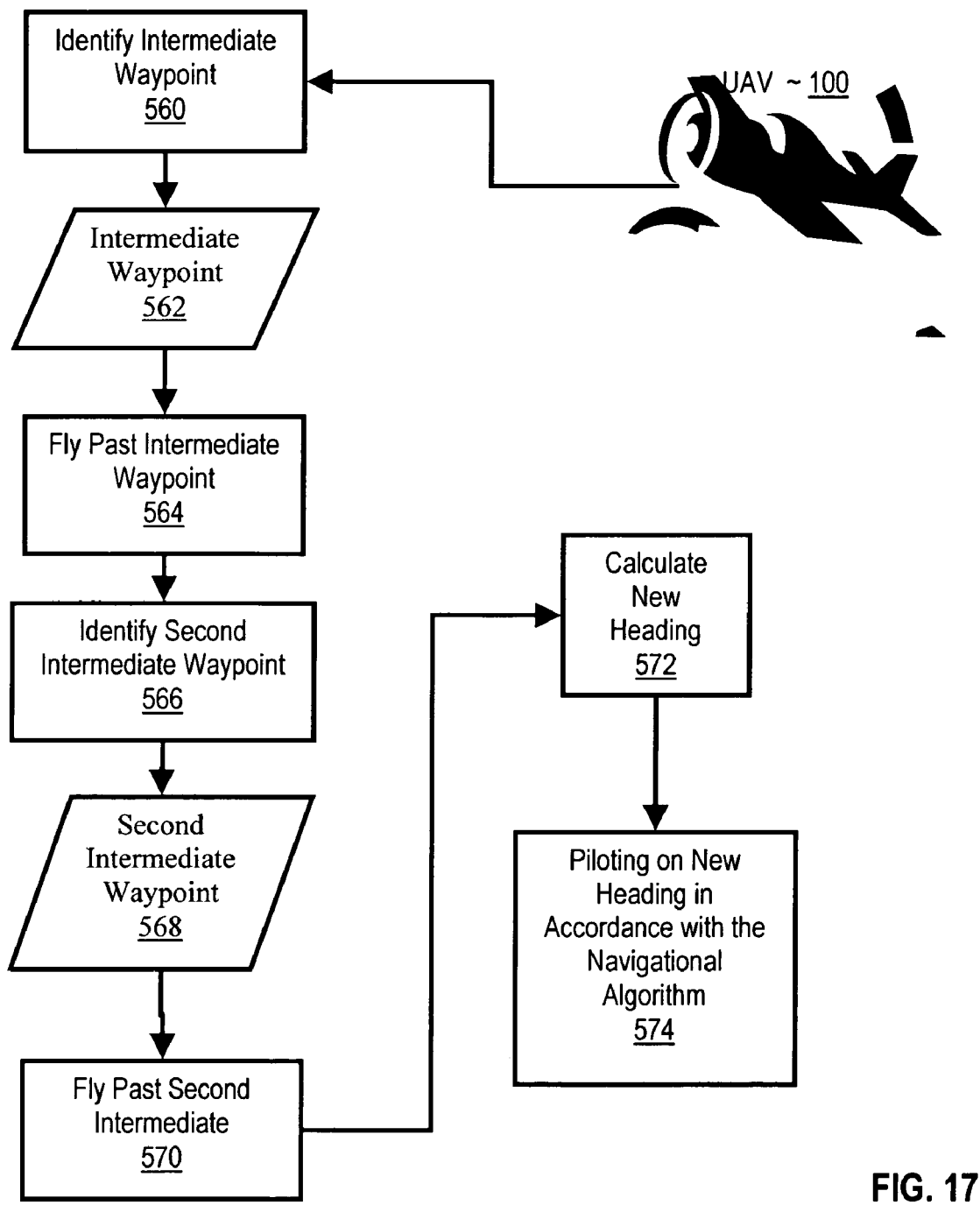
FIG. 17 sets forth a flow chart illustrating an exemplary method of piloting the UAV in accordance with an obstacle avoidance algorithm to avoid a no-fly zone.

The method of FIG. 17 also includes identifying (566) a second intermediate waypoint (568) on the originally anticipated flight course and flying (570) past the second intermediate waypoint (568). Identifying (566) a second intermediate waypoint (568) on the originally anticipated flight course advantageously returns the UAV to the course originally planned for the UAV absent identification of the obstacle.

The method of FIG. 17 includes calculating (572) a new heading to the original destination waypoint and piloting (574) on the new heading in accordance with a navigational algorithm. In many examples of the method of FIG. 17, the navigational algorithm for use in piloting on the new heading is the same navigational algorithm previously in use prior to deviating from the original flight path to avoid the obstacle.

Figure 18:
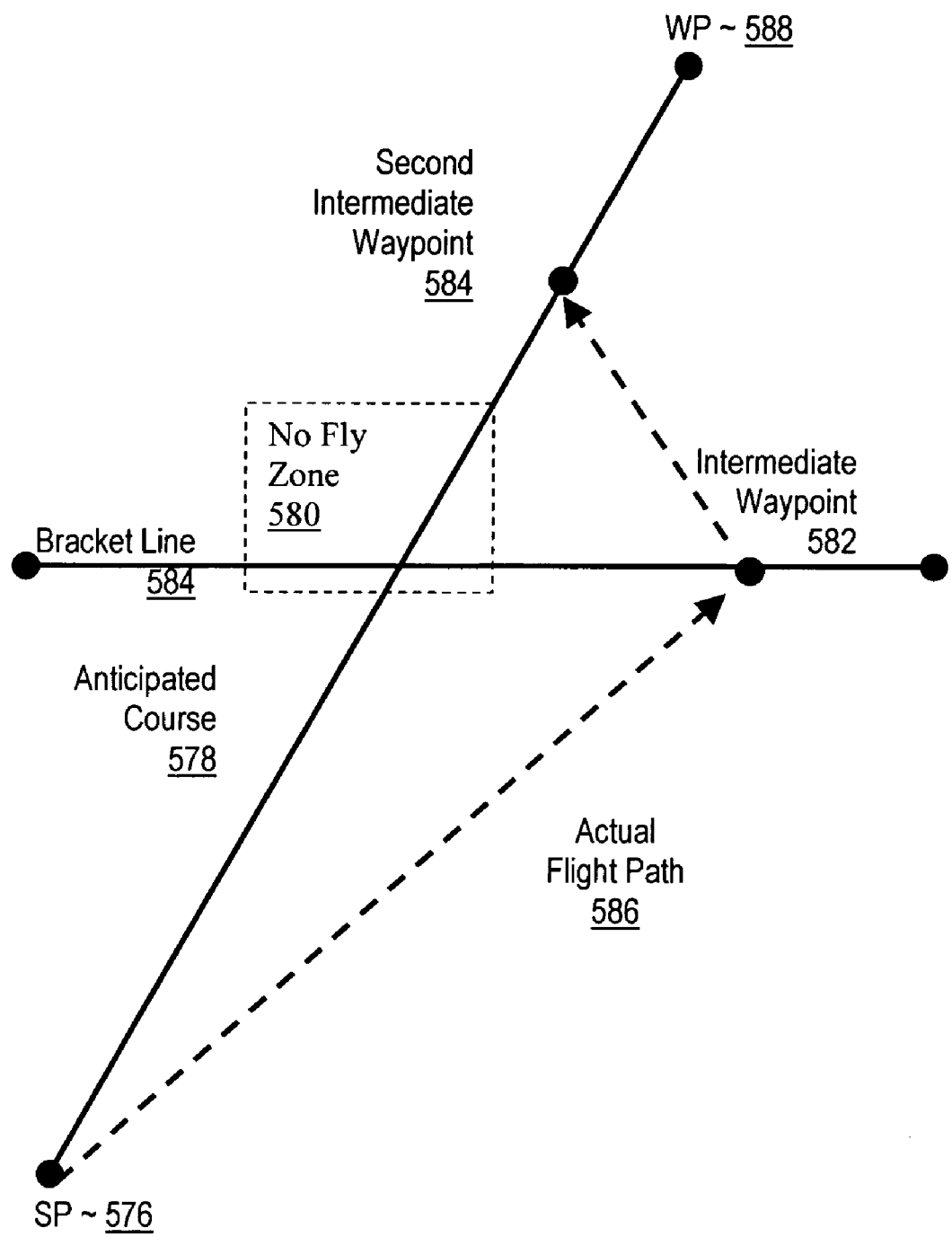
FIG. 18 sets forth a line drawing illustrating the flight path of a UAV implementing the method of FIG. 17.

For further explanation, FIG. 18 sets forth a line drawing illustrating the flight path of a UAV implementing the method of FIG. 17. In the example of FIG. 18 an intermediate waypoint (582) is located outside of the no-fly zone (580) and resides on a bracket line (584) that passes through the no fly zone (580). The second intermediate waypoint (584) resides on the original anticipated course (578) between the starting point (576) and the destination waypoint (588). In the example of FIG. 18, to avoid the no-fly zone (580) the UAV flies past the intermediate waypoint (582), calculates a new heading toward the second intermediate waypoint (58.4) flies past the second intermediate waypoint (584), calculates a new heading toward the destination waypoint (588) and pilots to the destination waypoint (588) in accordance with a navigational algorithm. The example of FIG. 18 results in an actual flight path (586) that avoids the no fly zone and the returns to flying on the original anticipated course (578).

The example of FIG. 18 results in a flight path that returns to the originally anticipated course. In some situations, it may be inefficient to return to the originally anticipated course. For further explanation, FIG. 19 sets forth a flow chart illustrating another exemplary method of piloting the UAV in accordance with an obstacle avoidance algorithm that does not return to the originally anticipated course. The method of FIG. 19 includes identifying (590) an intermediate waypoint (592) and flying (594) past the intermediate waypoint. One way of identifying (590) an intermediate waypoint (592) typically includes selecting a coordinate outside the no-fly zone. One way of selecting a coordinate is to define a bracket line running through the no-fly zone and then selecting a coordinate on the bracket line that is not within the no fly zone.

Figure 19:
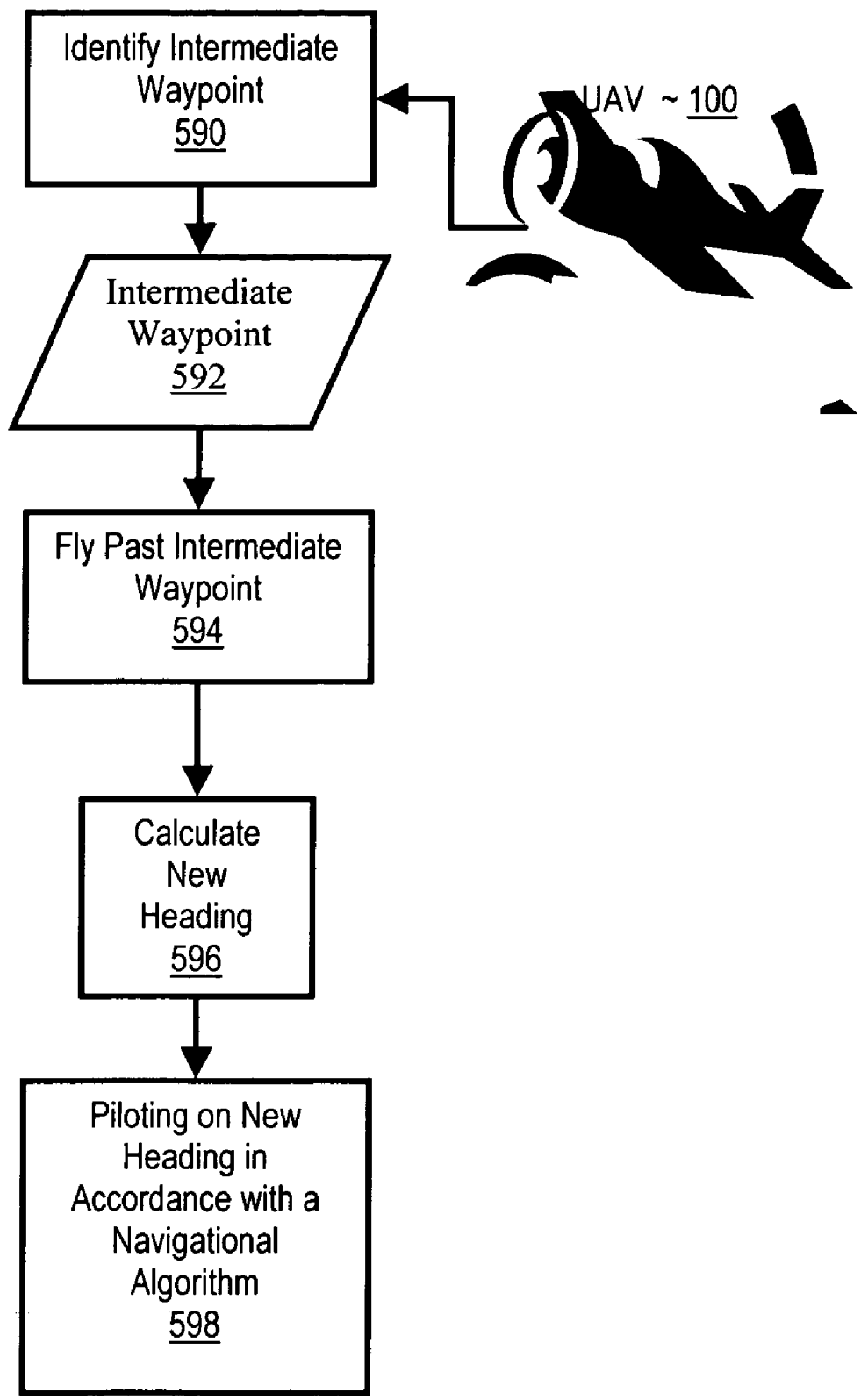
FIG. 19 sets forth a flow chart illustrating another exemplary method piloting the UAV in accordance with an obstacle avoidance algorithm that does not return to the originally anticipated course.

The method of FIG. 19 also includes calculating (596) a new heading to an original waypoint and piloting (598) on the new heading in accordance with a navigational algorithm. Examples of calculating headings and piloting in accordance with navigational algorithms are discussed above with reference to FIGS. 6–15. The inclusion of these examples of calculating headings and piloting in accordance with navigational algorithms is for explanation and not for limitation. All ways of calculating a new heading to an original waypoint and piloting on the new heading in accordance with a navigational algorithm are within the scope of the present invention.

Figure 20:
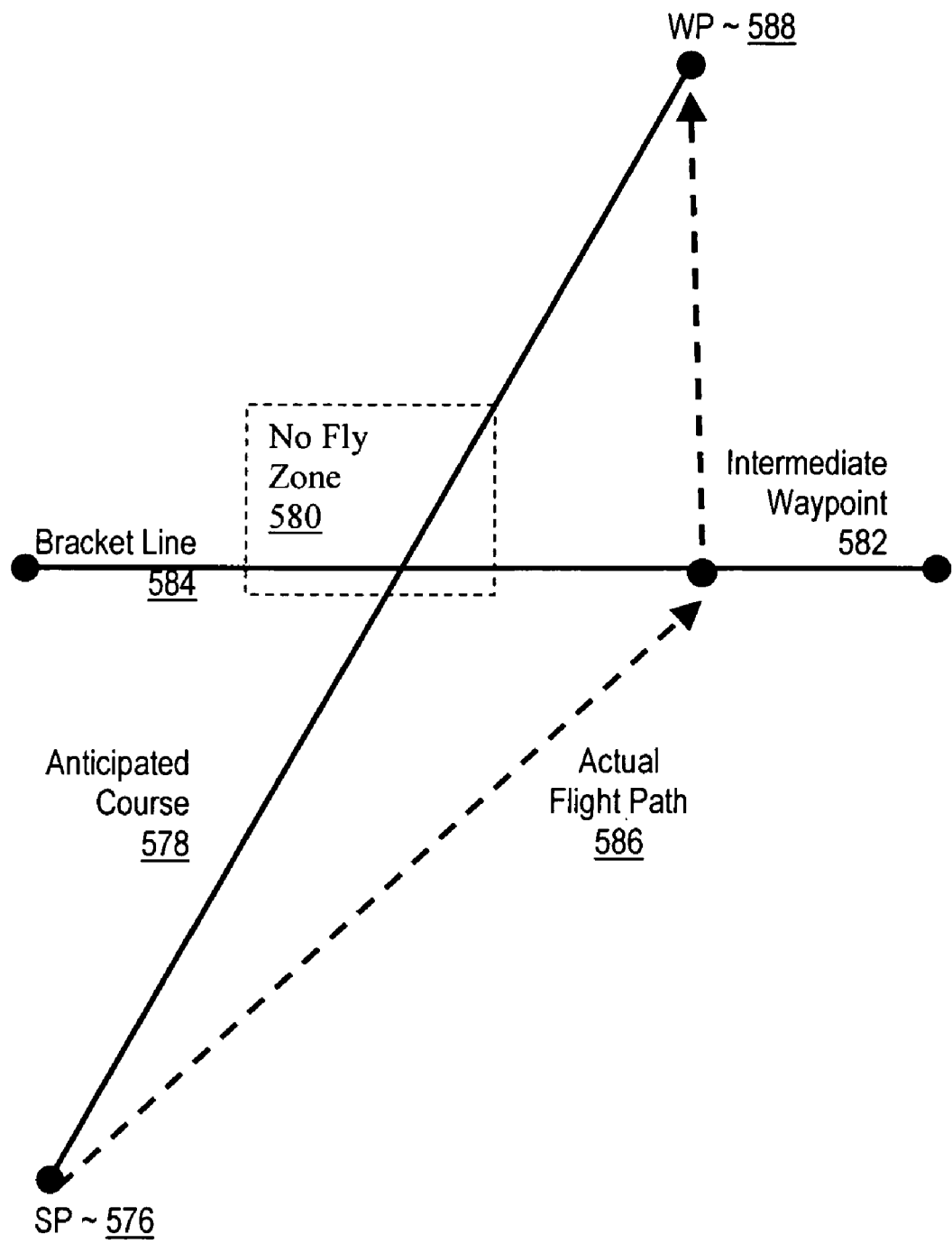
FIG. 20 is a line drawing illustrating the flight path of a UAV implementing the method of FIG. 19.

For further explanation, FIG. 20 is a line drawing illustrating the flight path of a UAV implementing the method of FIG. 19. In the example of FIG. 20, an intermediate waypoint (582) is located outside of the no-fly zone (580) and resides on a bracket line (584) that passes through the no fly zone (580). In the example of FIG. 20, to avoid the no-fly zone (580) the UAV flies past the intermediate waypoint (582), calculates a new heading toward the destination waypoint (588) and pilots to the destination waypoint in accordance with a navigational algorithm. The example of FIG. 18 results in an actual flight path (586) that does not return to the originally anticipated course (578).

In many embodiments, identifying an obstacle in the anticipated flight path of the UAV in dependence upon the depiction of the anticipated flight path includes identifying an object having a height greater than a current altitude of the UAV. One way of piloting the UAV in accordance with an obstacle avoidance algorithm for avoiding an object having a height greater than the current altitude of the UAV includes determining an new altitude greater than the height of the obstacle and piloting the UAV at the new altitude. Piloting the UAV at the new altitude includes determining a rate of increase in altitude that is results in adequately increasing the altitude of the UAV such that the altitude of the UAV is greater than the height of the obstacle before the UAV reaches the obstacle.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for navigating a UAV, the method comprising:
    piloting the UAV, under control of a navigation computer, in accordance with a navigation algorithm;
    while piloting the UAV:
    reading from a GPS receiver a sequence of GPS data;
    anticipating a future position of the UAV in dependence upon the sequence of GPS data;
    identifying an obstacle in dependence upon the future position;
    selecting an obstacle avoidance algorithm; and
    piloting the UAV in accordance with the selected obstacle avoidance algorithm.

2. The method of claim 1 wherein identifying an obstacle in dependence upon the future position further comprises retrieving obstacle data from a database in dependence upon the future position.

3. The method of claim 1 wherein identifying an obstacle in dependence upon the future position further comprises:
    depicting an anticipated flight of the UAV with 3D computer graphics in dependence upon the future position; and
    identifying an obstacle in dependence upon the depiction of the anticipated flight.

4. The method of claim 1 wherein piloting the UAV in accordance with the selected obstacle avoidance algorithm further comprises:
    identifying an intermediate waypoint;
    flying past the intermediate waypoint;
    identifying a second intermediate waypoint on an originally anticipated course;
    flying past the second intermediate waypoint;
    calculating a new heading to an original destination waypoint; and
    piloting on the new heading in accordance with a navigational algorithm.

5. The method of claim 1 wherein piloting the UAV in accordance with the selected obstacle avoidance algorithm further comprises:
    identifying an intermediate waypoint;
    flying past the intermediate waypoint;
    calculating a new heading to an original destination waypoint; and
    piloting on the new heading in accordance with a navigational algorithm.

6. The method of claim 1 wherein piloting the UAV in accordance with the selected obstacle avoidance algorithm further comprises:
    determining an altitude greater than the height of the identified obstacle; and
    piloting the UAV at the altitude.

7. A system for navigating a UAV, the system comprising:
    means for piloting the UAV, under control of a navigation computer, in accordance with a navigation algorithm;
    means for reading from a GPS receiver a sequence of GPS data;
    means for anticipating a future position of the UAV in dependence upon the sequence of GPS data;
    means for identifying an obstacle in dependence upon the future position;
    means for selecting an obstacle avoidance algorithm; and
    means for piloting the UAV in accordance with the selected obstacle avoidance algorithm.

8. The system of claim 7 wherein means for identifying an obstacle in dependence upon the future position further comprises means for retrieving obstacle data from a database in dependence upon the future position.

9. The system of claim 7 wherein means for identifying an obstacle in dependence upon the future position further comprises:
    means for depicting an anticipated flight of the UAV with 3D computer graphics in dependence upon the future position; and
    means for identifying an obstacle in dependence upon the depiction of the anticipated flight.

10. The system of claim 7 wherein means for piloting the UAV in accordance with the selected obstacle avoidance algorithm further comprises:
    means for identifying an intermediate waypoint;
    means for flying past the intermediate waypoint;
    means for identifying a second intermediate waypoint on an originally anticipated course;
    means for flying past the second intermediate waypoint;
    means for calculating a new heading to an original destination waypoint; and
    means for piloting on the new heading in accordance with a navigational algorithm.

11. The system of claim 7 wherein means for piloting the UAV in accordance with the selected obstacle avoidance algorithm further comprises:
    means for identifying an intermediate waypoint;
    means for flying past the intermediate waypoint;
    means for calculating a new heading to an original destination waypoint; and
    means for piloting on the new heading in accordance with a navigational algorithm.

12. The system of claim 7 wherein means for piloting the UAV in accordance with the selected obstacle avoidance algorithm further comprises:
    means for determining an altitude greater than the height of the identified obstacle; and
    means for piloting the UAV at the altitude.

13. A computer program product for navigating a UAV, the computer program product comprising:
    a recording medium;
    means, recorded on the recording medium, for piloting the UAV, under control of a navigation computer, in accordance with a navigation algorithm;
    means, recorded on the recording medium, for reading from a GPS receiver a sequence of GPS data;
    means, recorded on the recording medium, for anticipating a future position of the UAV in dependence upon the sequence of GPS data;
    means, recorded on the recording medium, for identifying an obstacle in dependence upon the future position;
    means, recorded on the recording medium, for selecting an obstacle avoidance algorithm; and
    means, recorded on the recording medium, for piloting the UAV in accordance with the selected obstacle avoidance algorithm.

14. The computer program product of claim 13 wherein means, recorded on the recording medium, for identifying an obstacle in dependence upon the future position further comprises means, recorded on the recording medium, for retrieving obstacle data from a database in dependence upon the future position.

15. The computer program product of claim 13 wherein means, recorded on the recording medium, for identifying an obstacle in dependence upon the future position further comprises:
- means, recorded on the recording medium, for depicting an anticipated flight of the UAV with 3D computer graphics in dependence upon the future position; and
- means, recorded on the recording medium, for identifying an obstacle in dependence upon the depiction of the anticipated flight.

16. The computer program product of claim 13 wherein means, recorded on the recording medium, for piloting the UAV in accordance with the selected obstacle avoidance algorithm further comprises:
- means, recorded on the recording medium, for identifying an intermediate waypoint;
- means, recorded on the recording medium, for flying past the intermediate waypoint;
- means, recorded on the recording medium, for identifying a second intermediate waypoint on an originally anticipated course;
- means, recorded on the recording medium, for flying past the second intermediate waypoint;
- means, recorded on the recording medium, for calculating a new heading to an original destination waypoint; and
- means, recorded on the recording medium, for piloting on the new heading in accordance with a navigational algorithm.

17. The computer program product of claim 13 wherein means, recorded on the recording medium, for piloting the UAV in accordance with the selected obstacle avoidance algorithm further comprises:
- means, recorded on the recording medium, for identifying an intermediate waypoint;
- means, recorded on the recording medium, for flying past the intermediate waypoint;
- means, recorded on the recording medium, for calculating a new heading to an original destination waypoint; and
- means, recorded on the recording medium, for piloting on the new heading in accordance with a navigational algorithm.

18. The computer program product of claim 13 wherein means, recorded on the recording medium, for piloting the UAV in accordance with the selected obstacle avoidance algorithm further comprises:
- means, recorded on the recording medium, for determining an altitude greater than the height of the identified obstacle; and
- means, recorded on the recording medium, for piloting the UAV at the altitude.

\* \* \* \* \*